United States Patent [19]
Bingo et al.

[11] Patent Number: 5,902,933
[45] Date of Patent: May 11, 1999

[54] PRESSURE SENSOR AND ITS APPLICATION

[75] Inventors: Hideyuki Bingo, Kyoto; Yasuhide Nishimuara, Kurayoshi; Kazuhisa Matsuda, Takatsuki; Nobuo Kakui; Tomonori Morimura, both of Kyoto; Yasushi Shimomoto, Osaka; Yoshihiro Umeuchi; Yoshitaka Sunagawa, both of Takatsuki; Takaji Nakamura, Abu-gun, all of Japan

[73] Assignee: Omron Corporation, Kyoto, Japan

[21] Appl. No.: 08/861,023

[22] Filed: May 21, 1997

Related U.S. Application Data

[63] Continuation of application No. 08/319,533, Oct. 7, 1994, abandoned.

[30] Foreign Application Priority Data

Feb. 23, 1993 [JP] Japan ........................... 5-54700
Aug. 27, 1993 [JP] Japan ........................... 5-235801

[51] Int. Cl.⁶ ........................... G01L 9/12; H01G 7/00
[52] U.S. Cl. ........................... 73/724; 73/718; 361/283.4
[58] Field of Search ................. 73/718, 724; 361/283.1, 361/283.3, 283.4; 372/20

[56] References Cited

U.S. PATENT DOCUMENTS

| | | | |
|---|---|---|---|
| 3,479,879 | 11/1969 | Music | 73/718 |
| 3,703,828 | 11/1972 | Bullard, Jr. et al. | 73/724 |
| 3,745,475 | 7/1973 | Turner | 328/134 |

(List continued on next page.)

FOREIGN PATENT DOCUMENTS

| | | |
|---|---|---|
| 0 256 811 | 2/1988 | European Pat. Off. |
| 0 430 676 | 6/1991 | European Pat. Off. |
| 0 481 272 | 4/1992 | European Pat. Off. |
| 0 520 352 | 12/1992 | European Pat. Off. |
| 0 528 551 | 2/1993 | European Pat. Off. |
| 4-177137 | 6/1992 | Japan . |
| 1060986 | 3/1967 | United Kingdom . |
| WO 89/10546 | 11/1989 | WIPO . |
| WO 89/11640 | 11/1989 | WIPO . |

OTHER PUBLICATIONS

Polla et al; "Integrated GaAs Microsensors"; 1990 *IEEE International Symposium on Circuits and Systems*, vol. 4, May 1990, pp. 3085–3088.

Kjensmo et al; "A CMOS Front–end Circuit for a Capacitive Pressure Sensor"; *Sensors and Actuators*, vol. A21, No. 1/3 Feb. 1990, pp. 102–107.

*Patent Abstracts of Japan*, vol. 10, No. 26 (P–425)(2083) Jan. 31, 1986.

*Primary Examiner*—George M. Dombroske
*Assistant Examiner*—Paul D. Amrozowicz
*Attorney, Agent, or Firm*—Foley & Lardner

[57] ABSTRACT

A pressure sensor includes a detection unit 1 having capacities C1 and C2 varied by a predetermined external action, a reference detection 2 unvaried by the predetermined external action, a first oscillator 31 and 32 for generating a detection frequency signal according to the capacities C1 and C2 of the detection unit 1, a second oscillator 33 for producing a reference frequency signal according to the capacity of the reference unit 2, and measuring circuits 34, 35, 36 and 37 for measuring the number of the periods of the detection frequency signal within a predetermined period of the reference frequency signal to produce a measured signal. The sensor can minimize a detection error, and directly convert the change of capacity into a pulse signal (digital signal) without convertion into an analog, so that the circuit construction be simplified and realized at a reduced cost. The gas meter G includes a gas pressure introducing path 155 formed on a wall of a measuring chamber 154 within its meter body 150, and the pressure sensor S secured on a wall of the measuring chamber 154 through a sealing means the pressure receiving portion of which communicates with the gas pressure introducing path 155, whereby any specific gas introducing tube to introduce the gas into the pressure sensor S is not required and the problems of sealing at an insertion portion of the specific gas introducing tube toward the measuring chamber 156 are resolved.

17 Claims, 27 Drawing Sheets

U.S. PATENT DOCUMENTS

| | | | |
|---|---|---|---|
| 4,016,764 | 4/1977 | Rice | 73/398 C |
| 4,104,595 | 8/1978 | Overzet | 328/1 |
| 4,208,918 | 6/1980 | Miyamae | 73/708 |
| 4,295,376 | 10/1981 | Bell | 73/724 |
| 4,392,382 | 7/1983 | Myers | 73/708 |
| 4,523,474 | 6/1985 | Browne et al. | 73/724 |
| 4,550,611 | 11/1985 | Czarnocki | 73/708 |
| 4,586,109 | 4/1986 | Peters et al. | 361/283 |
| 4,656,871 | 4/1987 | Czarnocki | 73/724 |
| 4,685,469 | 8/1987 | Keller | 128/675 |
| 4,732,043 | 3/1988 | Bell et al. | 73/708 |
| 4,793,187 | 12/1988 | Kordts | 73/708 |
| 4,876,892 | 10/1989 | Arabia et al. | 73/718 |
| 4,907,449 | 3/1990 | Call et al. | 73/170 R |
| 5,000,048 | 3/1991 | Kordts | 73/708 |
| 5,028,876 | 7/1991 | Cadwell | 324/678 |
| 5,042,308 | 8/1991 | Nakamura et al. | 73/718 |
| 5,181,423 | 1/1993 | Philipps et al. | 73/724 |
| 5,228,341 | 7/1993 | Tsuchitani et al. | 73/517 R |
| 5,291,534 | 3/1994 | Sakurai et al. | 377/20 |

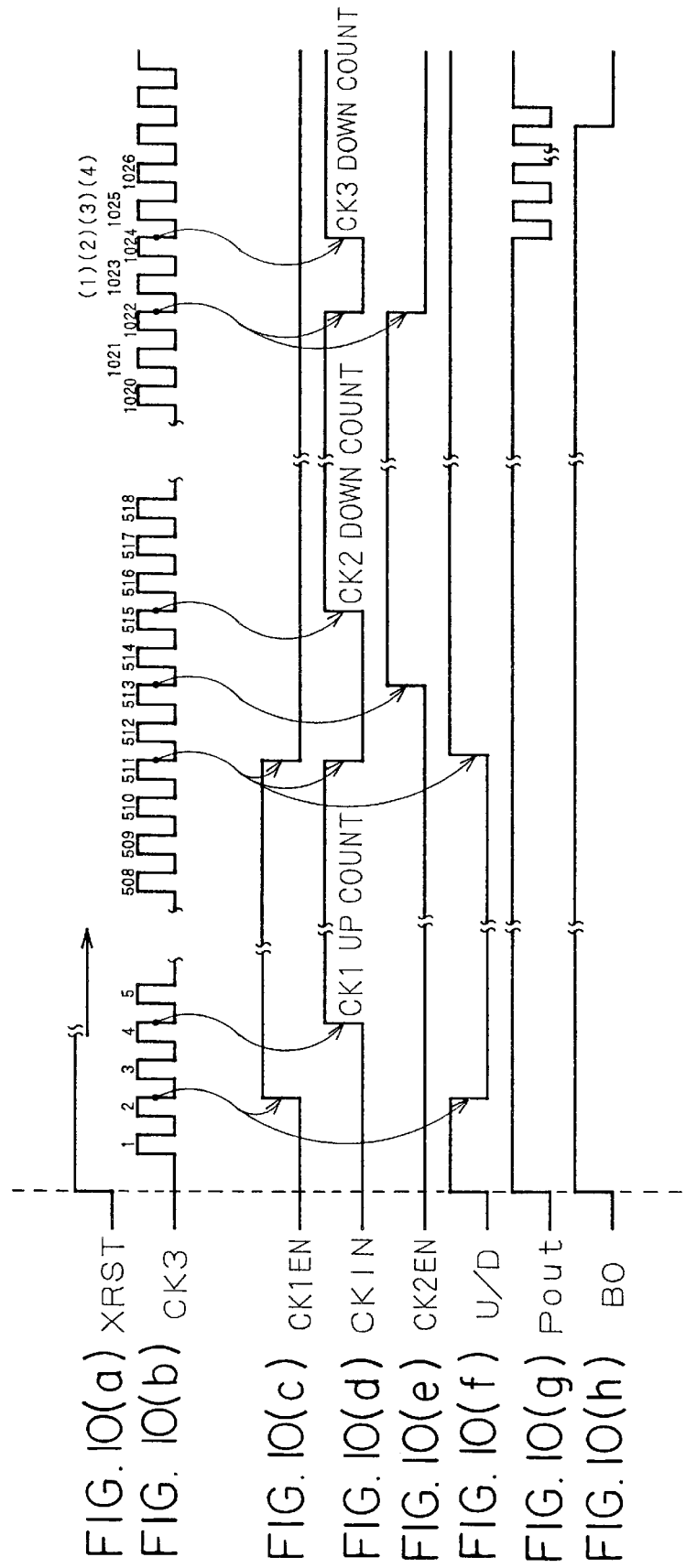

FIG. 30
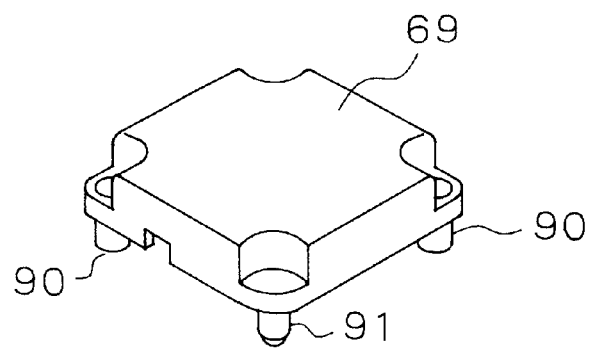
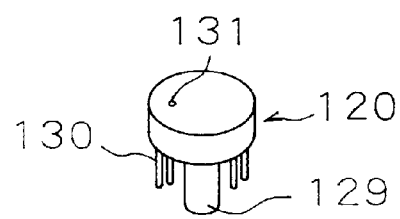
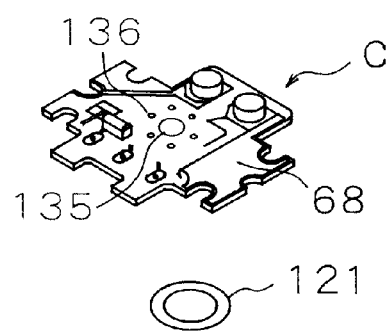
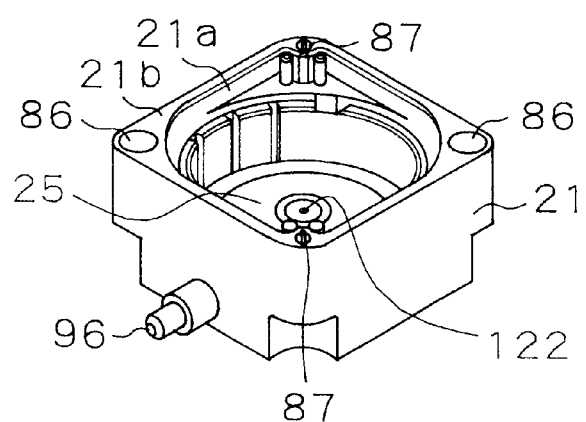

FIG. 33
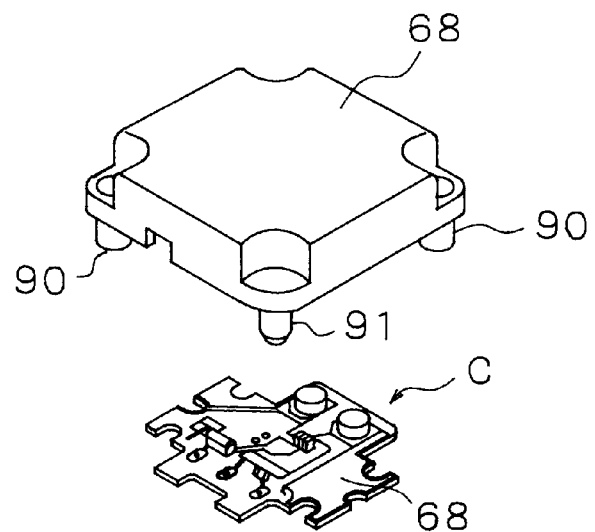
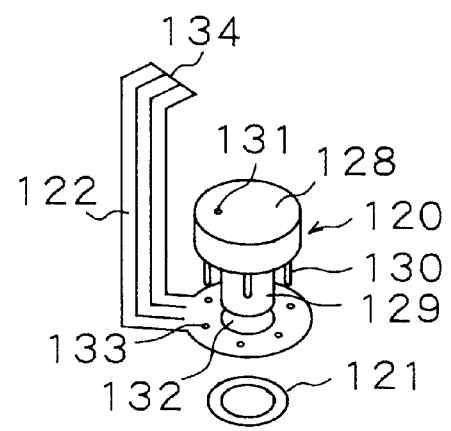
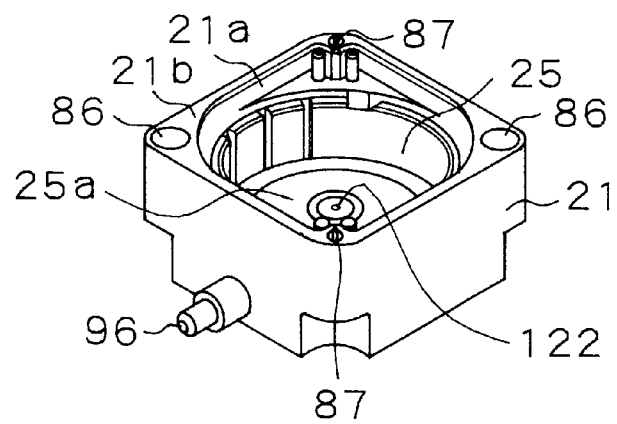

PRESSURE SENSOR AND ITS APPLICATION

This application is a continuation of application Ser. No. 08/319,533, filed Oct. 7, 1994, now abandoned.

BACKGROUND OF THE INVENTION

1. Field of the Invention

This invention relates to a pressure sensor including an electrostatic capacitance detection circuit for detecting a scalar quantity of a predetermined external action by utilizing an electrostatic capacity varied by the predetermined external action, and more particularly to an improved pressure sensor for detecting pressure of fluid to generate a signal in proportion to the detected pressure, which is suitable for installation to a gas meter.

2. Discussion of the Related Art

There has been hitherto proposed a pressure sensor including a housing made of metal, a diaphragm supporting a movable electrode with soldering which is fixed by the housing with soldering, a ring spacer made of plastics fixed to the housing by a screw, and an iron plate serving as a stationary electrode which is fixed by a screw opposing to the movable electrode. Due to the construction in which the movable blade is fixed to the diaphragm by soldering, the selection of the material for the diaphragm is restricted and the application of the proposed pressure sensor is restricted. In a production line of the pressure sensor, a special equipment for soldering is necessary, so that the productivity of a mass production for the sensor is deteriorated. Since the sensor has the construction made by the pair of movable and stationary electrodes, the deterioration of the linearity in the sensor by an incidental capacity cannot be avoided. If the linearity is desired to be retained, the compensation by a unique microcomputer must be prepared, which is not suitable for a high-precision application. The sensor is impossible to be corrected about humidity, so that it is not suitable for industrial use.

There has been proposed another pressure sensor having a connector disposed on a diaphragm at its center for pushing a movable electrode, and a lead from the movable electrode. The construction guiding the lead from the movable electrode invites deterioration in its assembling efficiency. Moreover, if negative pressure is applied to the sensor, an excessive force is applied to a center of the diaphragm causing performance change or destruction thereof.

A conventional electrostatic capacity detection circuit includes a detection unit in which its electrostatic capacity is changed by an external action, such as pressure, acceleration, displacement, or the like, to detect the scalar quantity of the external action by measuring an absolute value of an analog electrostatic capacity. Recently a microcomputer is often employed to control a system based on the detected value and to display a digital value for the detected value. An analog signal obtained by measuring the electrostatic capacity is amplified to be converted into a digital signal by an analog-to-digital (A/D) converter for application to the microcomputer, whereby control of the system or digital display is executed.

Such a conventional electrostatic capacity detection circuit invites a bit error in the conversion from the analog signal into the digital signal. Accordingly, an expensive A/D converter having a large number of bits is necessary to decrease the bit error. Moreover, a high accurate amplifier for amplifying the analog signal with temperature compensation is required. Due to the design of measuring the absolute value of the electrostatic capacity, a measurement error is caused by imbalance of the relation between the scalar quantity of the external action and the electrostatic capacity which happens when a dielectric constant changes by circumstances of the detection unit.

As an application of a conventional pressure sensor, there has been proposed a gas meter including the pressure sensor, a seismoscope, and a judging circuit for controlling cut-off of gas by receiving a detected signal from the pressure sensor and the seismoscope, which are mounted on a common printed board to be installed in a meter body of the gas meter while a gas introducing pipe to be connected to the pressure sensor is inserted into a measuring chamber of the meter body in the gas meter. The pressure sensor of a board mounting type needs the gas introducing pipe to be connected with the sensor and the insertion of the pipe into the measuring chamber to be sealed by a sealing means presenting a sealing problem.

SUMMARY OF THE INVENTION

It is, therefore, a primary object of this invention to provide an improved pressure sensor which has an excellent assembling performance, is able to correct an absolute value of characteristics by a circuit process without any necessity of complicated process for correcting an original point in use, has a good linearity of sensing hard to be affected by temperature or humidity, and has a good productivity with a decreased number of parts and a reduced cost.

It is a further object of this invention to provide an improved pressure sensor capable of detecting a precise electrostatic capacity with a fairly simplified and cost-reduced construction and without any temperature compensation, whereby a detection with reduced error can be performed even if a dielectric constant varies under circumstance around a detection unit.

It is a still further object of this invention to provide a gas meter employing an improved pressure sensor having a reduced number of parts and an excellent productivity at a reduced cost, which does not need any gas introducing pipe for introducing gas into the pressure sensor, whereby problems of sealing at an inserted portion of the gas introducing pipe within a measuring chamber are avoided.

It is another object of this invention to provide a gas meter in which a pressure sensor is fixed on a wall portion of a measuring chamber in a body of the gas meter by a sealing means, and a gas pressure introducing path provided on the wall portion of the measuring chamber is connected with a pressure receipt of the pressure sensor.

According to a primary aspect of this invention, there is provided a pressure sensor including a detection unit having an electrostatic capacity varying in accordance with a predetermined external action, a reference unit having an electrostatic capacity unaffected by the predetermined external action, and a signal processing unit for providing a desired signal by processing the electrostatic capacities detected by the detection unit and the reference unit. Since the pressure sensor has an excellent assembling performance and can correct an absolute value of characteristics by a circuit processing without any necessity of complicated process for correcting an original point in use, it has a good linearity of sensing hard to be affected by temperature or humidity, and a good productivity with a decreased number of parts and a reduced cost.

According to another aspect of this invention to provide a pressure sensor including a detection unit having an electrostatic capacity varying in accordance with a predetermined external action, a reference unit having an electrostatic capacity unaffected by the predetermined external action, a first oscillator for producing a detection frequency signal in accordance with the electrostatic capacity of the detection unit, a second oscillator for producing a reference frequency signal in accordance with the electrostatic capacity of the reference unit, and a measuring unit for measuring a number of periods in the detection frequency signal within predetermined periods of the reference frequency signal to produce a measurement signal. The electrostatic capacity provided by the detection unit is directly converted into a digital signal without employing any A/D converter, so that electrostatic capacity can be precisely detected by simplified and cost-reduced construction without employing any temperature compensation. Measurement of a relative value between the electrostatic capacities of detection unit and reference unit provides detection with reduced error even when the dielectric constant varies under circumstance around the detection unit.

BRIEF DESCRIPTION OF THE DRAWINGS

Other objectives and advantages of this invention will be more readily apparent from the following detailed description provided in conjunction with the following figures, of which:

FIGS. 10(a)–10(h) show pulse wave forms illustrating a timing chart of signals in the circuit of FIG. 8;

FIG. 30 is a perspective disassembled view of the pressure sensor of FIG. 29;

FIG. 33 is a perspective disassembled view of a pressure sensor as a ninth embodiment of this invention;

DETAILED DESCRIPTION OF THE INVENTION

[First Embodiment]

Figure 1:
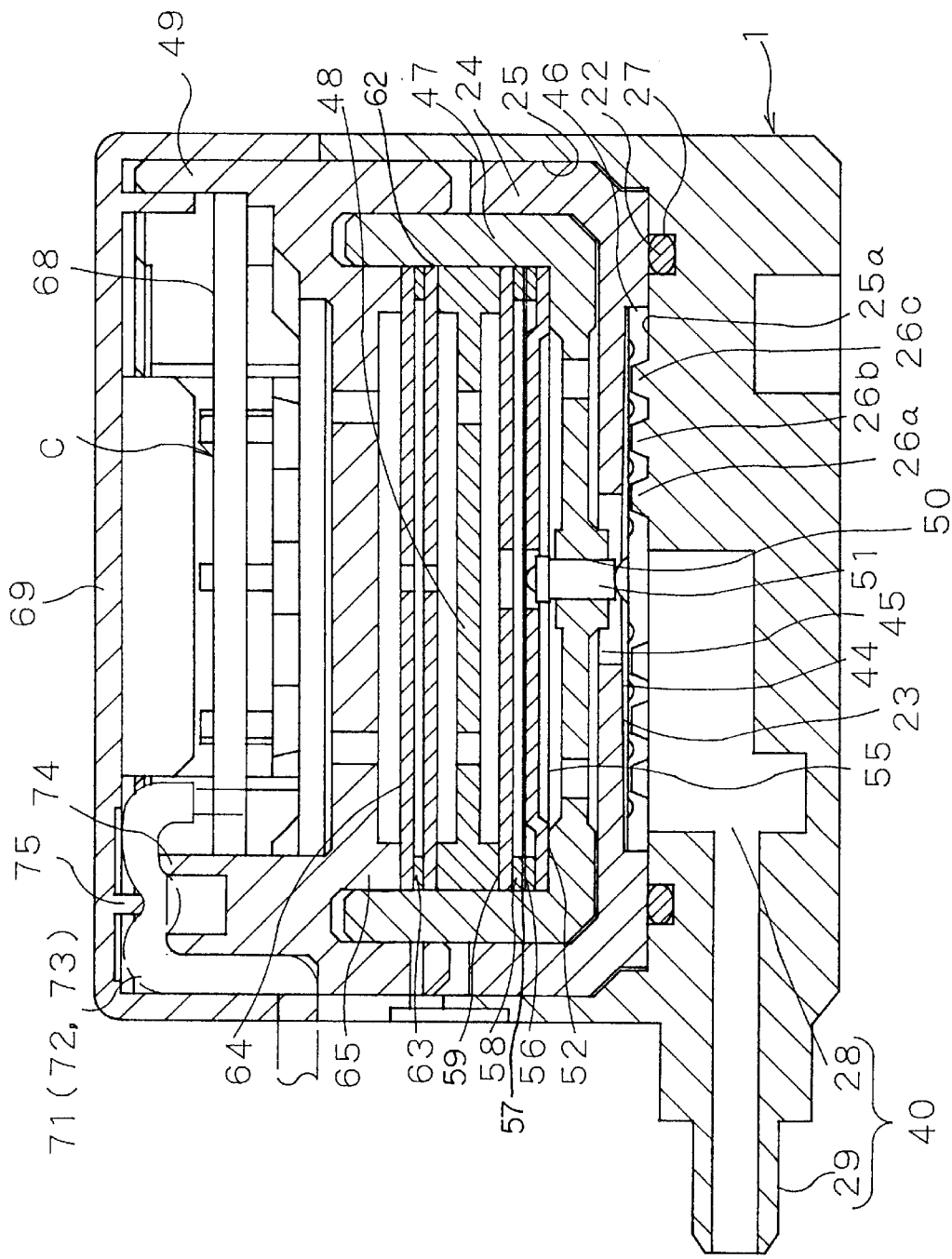
FIG. 1 is a longitudinal sectional view of a pressure sensor as a first embodiment of according to this invention.
Figure 2:
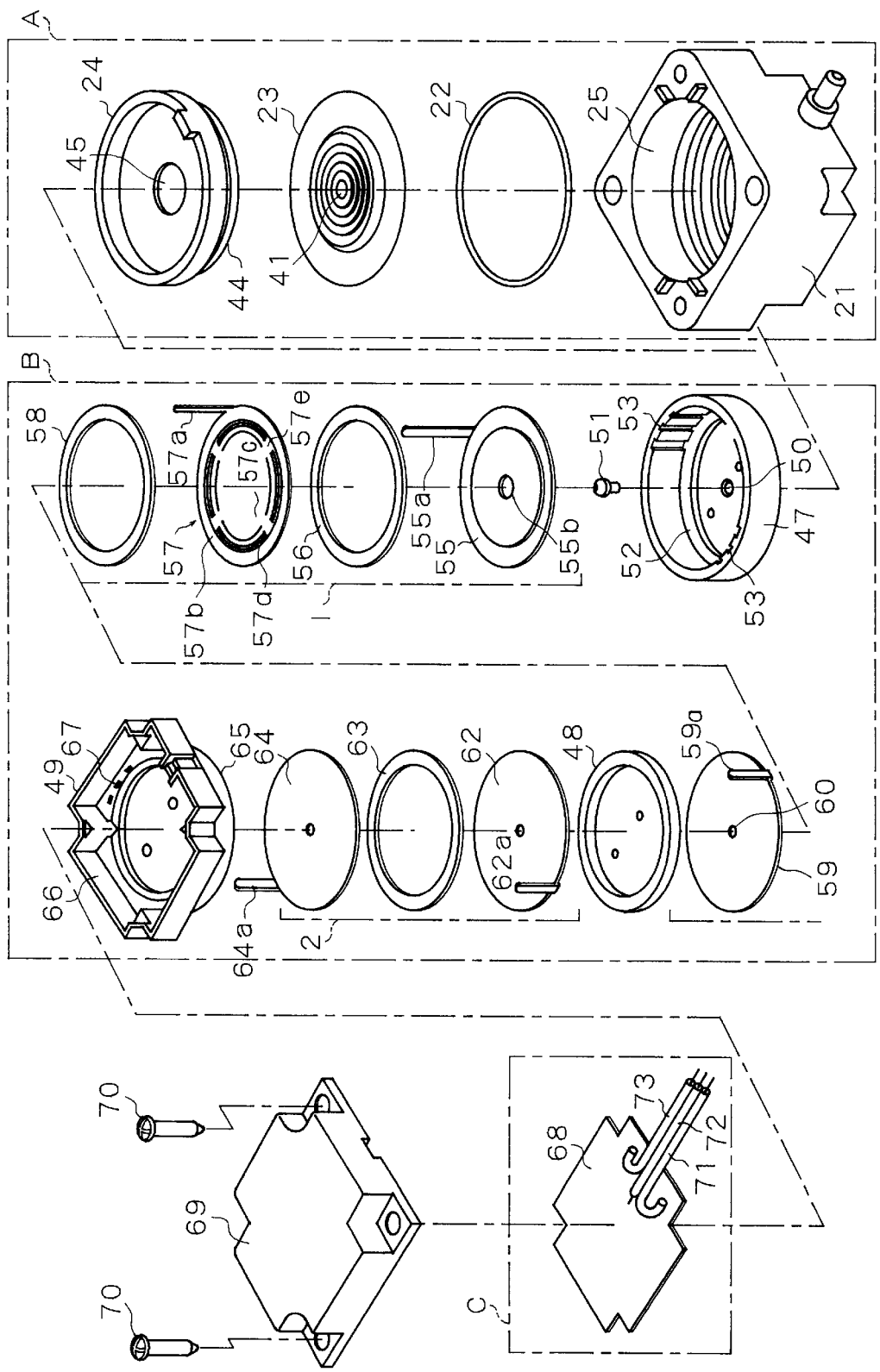
FIG. 2 is a perspective disassembled view of the pressure sensor of FIG. 1.

Referring, now, to FIG. 1, there is shown a longitudinal sectional view of a pressure sensor as a first embodiment of this invention. In FIG. 2, there is shown a disassembled view of the pressure sensor including a pressure receiving unit A, a sensor unit B as a sensor block, and a signal processing unit C as a signal processing means. An electrostatic capacity generation circuit is composed of a detection unit 1 and a reference unit 2 in the sensor unit B, and a gate array and a pulse generation circuit in the signal processing unit C.

The pressure receiving unit A includes a base 21, an O ring 22, a diaphragm 23, and a diaphragm holder 24. The base 21 is provided with a cylindrical chamber 25 having a circular section in a horizontal view and a circular bottom wall 25a which includes a plurality of coaxial stoppers (negative pressure stoppers) 26a, 26b and 26c having a concentricity at a center of the circular bottom wall 25a and an O ring engagement groove 27 outwardly of stopper 26c. The bottom wall 25a further includes a recess portion 28 in a radius direction from the center of wall 25a and a connection tube 29 projecting from a side peripheral of the wall 25a which is internally communicated with the recess portion 28, to provide an inflow inlet 40.

Figure 3:
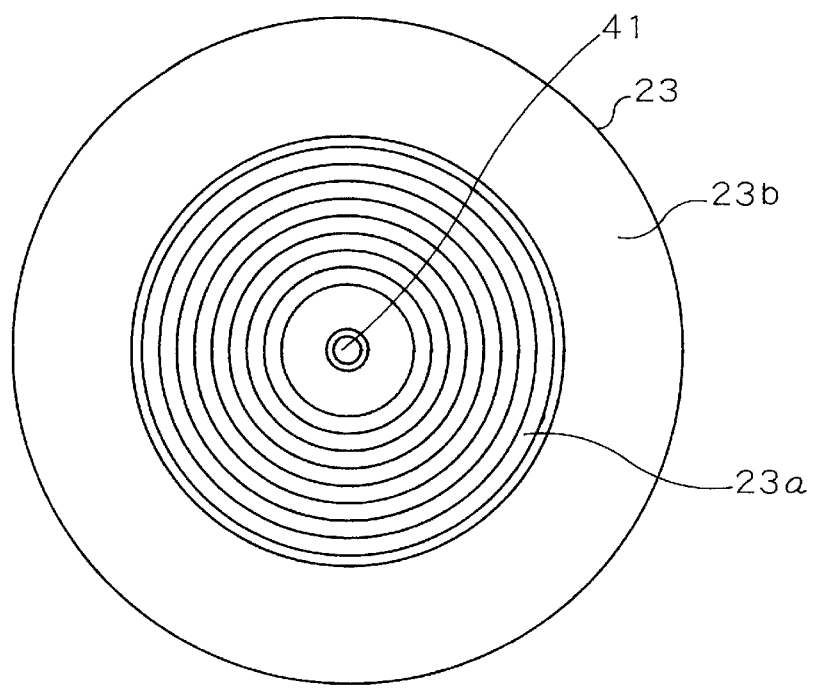
FIG. 3 is a plane view of a diaphragm employed in the pressure sensor.
Figure 4:
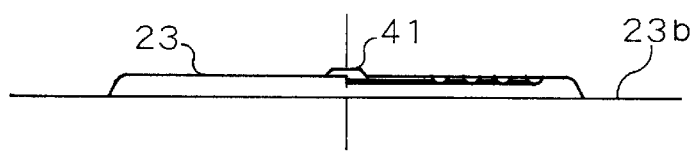
FIG. 4 is a partially sectional side view of the diaphragm.
Figure 5:
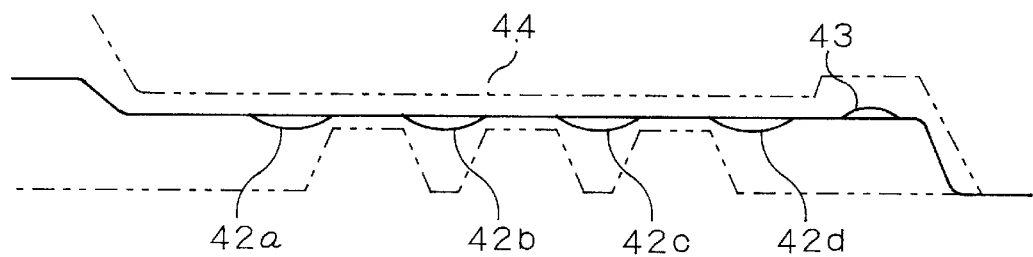
FIG. 5 is a partial sectional view of the diaphragm.

The diaphragm 23 is made of metals, and is of a dish shape. As shown in FIGS. 3 to 5, the diaphragm is provided with a face 23a, a flat ring-shaped mounting portion 23b disposed at a peripheral of the face 23, a plunger receptacle 41 disposed on a center of the face, a plurality of ring-shaped downward projections 42a, 42b, 42c, and 42d coaxially disposed at the receptacle 41 (FIG. 5), and an upward projection 43 disposed on an upper flat surface of the face 23 outwardly of the downward projection 42d.

The diaphragm holder 24 has a circular bottom wall to be housed within the chamber 25 of the base 21, an external surface of which is flat and provides a stopper 44 (positive pressure stopper) at its center having an opening 45. Within the chamber 25 of the base 21, an O ring 22 is engaged with the O ring engagement groove 27, and the diaphragm 23 and the diaphragm holder 24 are enclosed. The diaphragm holder 24 fixes the diaphragm 23 by fixing a mounting portion 23b of the diaphragm. The diaphragm 23 is seated within a diaphragm chamber 46 (FIG. 1) formed by the bottom wall 25a of base 21 and stopper 44 of diaphragm stopper 24, and the diaphragm chamber 46 at its pressure receiving portion is communicated with the inflow inlet 40.

The sensor unit B includes an electrode holder 47, a detection unit (differential sensing unit) 1, a spacer 48, a reference unit 2, and an electrode holder 49. A supporting hole 50 is disposed at a center of the electrode holder 47, and supports a movable plunger 51 for a movement. An electrode supporting portion 52 is disposed on a bottom wall of the electrode holder 47, and terminal insertion grooves 53 are formed on an inner side wall of the holder 47.

The detection unit 1 includes one disc-shaped stationary electrode 55 having a terminal 55a, one insulating ring film 56, a disc shaped movable electrode 57 having a terminal 57a, the other insulating ring film 58, and the other disc-shaped stationary electrode 59 having a terminal 59a. The stationary electrode 55 at its center is provided with a hole 55b. The movable electrode 57 at its peripheral includes a holding portion 57b, and at its center includes a movable portion 57c. A plurality of slits 57d are disposed between the holding portion 57b and the movable portion 57c, and each supporting portion 57e between slits 57d supports the movable portion 57c.

The reference unit 2 includes one disc-shaped stationary electrode 62 having a terminal 62a, an insulating ring film 63, the other disc-shaped stationary electrode 64 having a terminal 64a.

The electrode holder 49 at its lower portion includes a pressing member 65, and at its upper portion includes a signal processing unit chamber 66 at its peripheral provided with a plurality of terminal openings 67.

Within the electrode holder 47, there is enclosed the detection unit 1 in the order of stationary electrode 55, insulating film 56, movable electrode 57, insulating film 58, and stationary electrode 59 in a piled up fashion, wherein the holding portion 57b of the movable electrode 57 is sandwiched by insulating films 58 and 56, and terminals 55a, 59a and 57a are inserted into terminal insertion grooves 53 on the internal wall of the electrode holder 47.

On the detection unit 1 within the electrode holder 47, there are put spacer 48 and the reference unit 2 in the order of stationary electrode 62, insulating film 63, and stationary electrode 64, wherein terminals 62a and 64a are inserted into the grooves 53. The electrode holder 49 is further put on the reference unit 2, so that the holding member 65 of the electrode holder 49 is inserted within holder 47 through reference unit 2, spacer 48 and detection unit 1, and the terminal openings 67 of holder 49 are pierced by terminals 55a, 59a, 57a, 62a, and 64a toward the signal processing unit chamber 66.

Thus constructed sensor unit B is enclosed within the chamber 25 of the base 21 of the pressure receiving unit A, wherein a lower end of the plunger 51 comes into contact with plunger receptacle 41 of the diaphragm 23 and an upper end thereof comes into contact with movable portion 57c of the movable electrode 57 from bottom.

Figure 6:
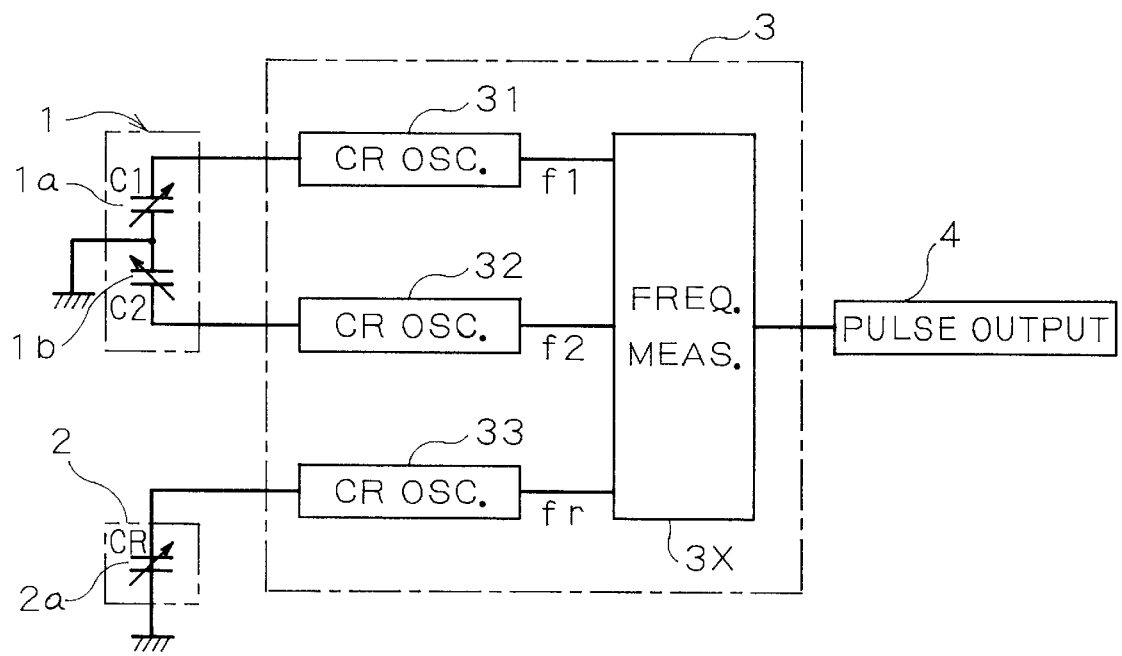
FIG. 6 is a schematic block diagram of an electrostatic capacity detection circuit employed in the sensor.

The signal processing unit C includes board 68 having a configuration fitting into the chamber 66. On the board 68 there are disposed a gate array 3 as an electrostatic capacity detection circuit and a pulse output circuit 4 as shown in FIG. 6. The signal processing unit C is seated in the chamber 66 of the electrode holder 49, in which the terminals 55a, 59a, 57a, 62a and 64a are connected with the respective connecting portions of board 68. A case 69 covers the electrode holder 49, and is secured to the base 21 by screws 70. Lead wires 71, 72 and 73 connected with board 68 are sandwiched by projections 74 and 75 respectively disposed on electrode holder 49 and cover 69 for reinforcement, and extend outwardly from the cover 69.

In the sensor unit B, the detection unit 1 composed by the pair of stationary electrodes 55 and 59 and the movable electrode 57 is provided with an electrostatic capacity C1 of a capacitor 1a composed by stationary electrode 55 and movable electrode 57, and with an electrostatic capacity C2 of a capacitor 1b composed by stationary electrode 59 and movable electrode 57. The reference unit 2 composed by the pair of stationary electrodes 62 and 64 is provided with a reference electrostatic capacity CR of a capacitor 2a.

In the gate array 3, there are disposed CR oscillators 31, 32 and 33 respectively generating oscillation frequencies f1, f2 and fr which are defined by the electrostatic capacities C1, C2 and CR and resistances (not shown in drawings), and a frequency measuring circuit 3X which receives signals from the oscillators 31, 32 and 33 to generate, in one period of the reference oscillation frequency fr from CR oscillator 33, a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Units A and B are fixed into a position where a desired output is obtained by inserting the sensor unit B into the pressure receiving unit A. The method for fixing units A and B employs press insertion and filling glue for reinforcement to avoid occurrence of scale change as time elapses. Such press insertion is applied to a groove made in the direction at the circumference between base 21 and sensor unit B on assembling thereof so as to fix only necessary portions. The base 21 is provided with a pair of small openings, one for filling glue and another for ventilation.

An operation of the above-constructed pressure sensor will be described hereinafter. When the pressure in the diaphragm chamber 46 on a pressure receiving side is zero, the movable electrode 57 of the detection unit is not displaced, so that the electrostatic capacities are equal each other. Accordingly, oscillation frequencies f1 and f2 become equal, the frequency difference between the oscillation frequency f1 in the first half period of the reference oscillation signal fr supplied by CR oscillator 33 and the oscillation frequency f2 in the second half period of the reference signal fr becomes zero, and any pulse signal is not generated from the gate array 3.

As pressure fluid, for example, gas, flows in the receiving section of the diaphragm chamber 46 from the inflow inlet 40, the diaphragm 23 is displaced in an upward direction in FIG. 1. The displaced diaphragm 23 pushes the movable portion 57c of movable electrode 57 through plunger 51 for displacement in an upward direction in FIG. 1, and the capacities C1 and C2 respectively have different values. Accordingly, there is produced a frequency difference between oscillation frequency f1 in the first half period of the reference oscillation signal fr and oscillation frequency f2 in the second half period of the signal fr, and the gate array 3 produces the frequency difference, viz., a pulse signal having a pulse number in proportion to the pressure to be detected.

The capacities C1 and C2 are changed by peripheral circumstances, such as temperature, material composition of pressure fluid for measuring pressure. Therefore, the respective oscillation frequencies f1 and f2 in the CR oscillators 31 and 32 are changed, and the capacity CR in the reference unit 2 also is simultaneously changed, so that measurement error by change of circumstances of peripheral can be resolved without employing any compensation circuits.

The pressure sensor of this embodiment includes the pressure receiving unit A for detecting the pressure of pressure fluid; the sensor unit B being provided with the detection unit 1 having stationary electrodes 55 and 59 and the movable electrode 57 insulated and supported between electrodes 55 and 59 which is movable in response to pressure detected by the pressure receiving unit A, and with the reference unit 2 having stationary electrodes 62 and 64 spaced therebetween; and the signal processing unit C for processing the capacities C1, C2 and CR in the units 1 and 2 to generate a desired signal. Thus, since the pressure sensor is constructed on the unit basis, its assembling efficiency is improved, each unit can be inspected, and its performance and productivity is improved. The respective sections A, B and C can be assembled in one direction, whereby its mass productivity is improved and its assembling can be automated. Any specific manufacturing method is unnecessary, investment for manufacturing can be reduced, and its productivity is greatly improved with reduced cost.

In the pressure receiving unit A, the diaphragm 23 has a flat surface perpendicular to its displacing direction and can be provided with stopper portions (positive pressure stoppers of the diaphragm holder 24) of great precision, so that its pressure resisting performance can be improved. The output performance can be designed to be variable by replacing the diaphragm 23 with others for application to many usages (pressure specifications).

In the sensor unit B, the differential sensing unit (detection unit 1) provides a sensing linearity hard to be affected by temperature and humidity. The sensing performance can be ensured only by precision of thickness of the insulating films 55 and 58, without any specific materials and with reduced cost. The reference unit 2 is enclosed within the unit, and absolute value of characteristics can be corrected by circuit processing, so that any complicated operation, such as correction of original point, can be avoided.

Though in this embodiment there are provided negative and positive pressure stoppers for protecting the diaphragm 23 from being deformed by overload, either the negative pressure stopper or the positive one may be omitted.

Though the reference unit 2 is disposed leaving a gap from the detection unit 1 through the spacer 48 to avoid mutual interference therebetween, the gap may be replaced by disposing an ground electrode between the reference unit 2 and the sensing unit 1 to provide an equivalent effect.

In the detection unit 1, the stationary electrodes 55 and 59 and the movable electrode 57 are disposed to have the maximum effective area for mutual opposition for reduction of incidental capacity. The stationary electrode 59 may be designed to have a projection made of insulating materials for the purpose of prevention of electrical short by contact of the electrodes 59 and 57 when an overload is applied, or the movable electrode 57 may be coated with an insulating film instead of the projection for that purpose.

Moreover, the housing may be covered by a shield layer of metals to avoid the fluctuation of output of this device caused by external electrical field if desired.

Figure 7:
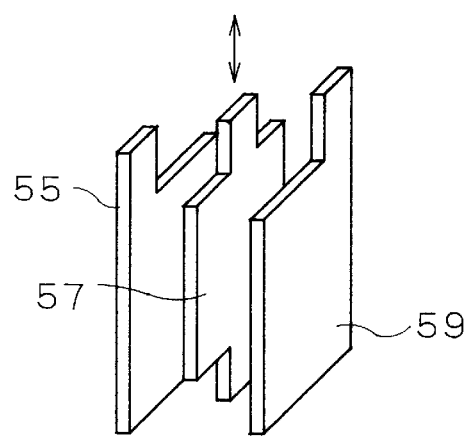
FIG. 7 is a perspective view of a detection unit of a differential type as a modification.

As shown in FIG. 7, the detection unit 1 may be modified into an area variable fashion, in which stationary electrodes 55 and 59 are disposed vertically and a movable electrode 57 is disposed between the electrodes 55 and 59 for a vertical movement in response to the movement by the plunger 51 to improve the sensing linearity.

The diaphragm 23 of this embodiment may be replaced with a metal bellows, or may be modified to be a metal diaphragm secured into the base 21.

The electrostatic capacity detection circuit of this embodiment will be described hereinafter.

In FIG. 1, the movable electrode 57 is shifted or biased toward the stationary electrode 59 by the plunger moving upwardly (in response to an external action), but remains just in the middle of a gap between stationary electrodes 55 and 59 to divide the gap into equal halves when no action is applied to the pressure sensor (called as "normal state" hereinafter). In the normal state, the electrostatic capacitance C1 of a capacitor 1a provided by one stationary electrode 55 and movable electrode 57 is equal to the electrostatic capacity C2 of the capacitor 1b provided by the other stationary electrode 59 and the movable electrode 57.

When the movable electrode 57 is biased in response to an external action (called as "biased state"), the capacities C1 and C2 have different values respectively. In this embodiment, the capacity C1 is designed to be smaller than the capacity C2 in the biased state. Accordingly, the scalar quantity of external action can be detected by measuring the difference between the capacities C1 and C2. The movable electrode 57 is grounded, and the stationary electrodes 55 and 59 are connected with an associated circuit which will be explained later.

The reference unit 2 is composed of the stationary electrodes 62 and 64 as mentioned above, and the electrostatic capacity CR of the capacitor 2a provided by stationary electrodes 62 and 64 is not changed by any external action. In this electrostatic capacity detection circuit the capacity CR is equal to the capacity C1 and C2 of the detection unit 1 in the normal state. One of electrodes 62 and 64 is grounded, and the other is connected with the associated circuit. The respective capacities C1, C2 and CR of capacitors 1a, 1b, and 2a of the detection unit 1 and the reference unit 2 vary as the dielectric constants vary by external circumstance.

Figure 8:
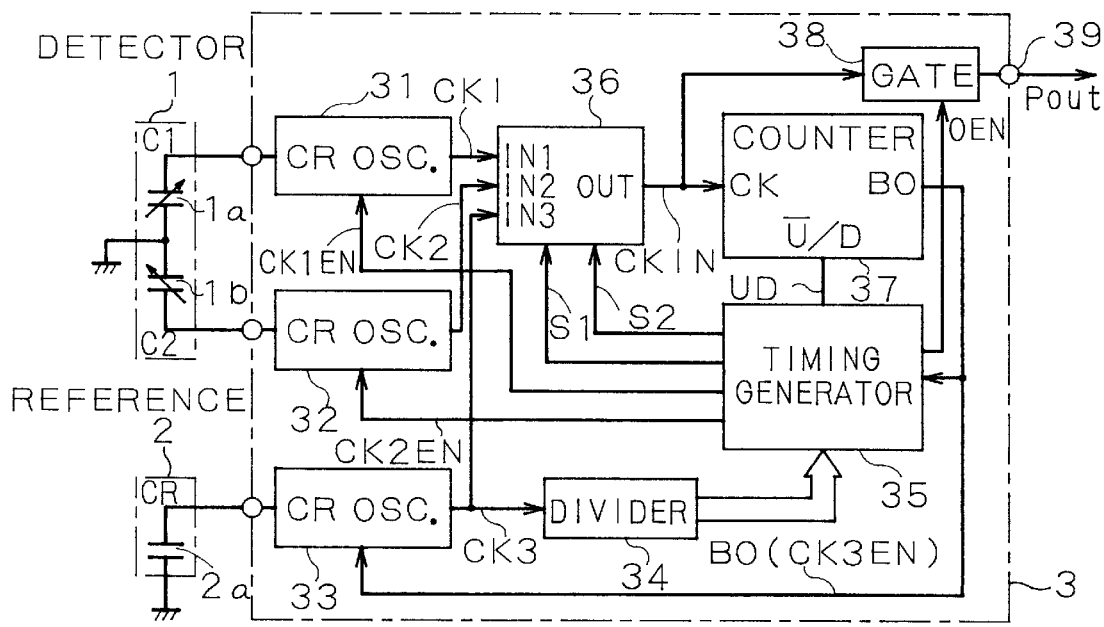
FIG. 8 is a block diagram of the electrostatic capacity detection circuit of the pressure sensor of FIG. 1.

In FIG. 8 there is shown a detailed block diagram of the gate array 3 representing the electrostatic capacity detection circuit. The CR oscillator 31 connected with the capacitor 1a of the detection unit 1 generates a clock signal CK1 which is a pulse signal of a frequency defined by the capacity C1 and a resistor (not shown). The CR oscillator 32 connected with the capacitor 1b of the detection unit 1 generates a clock signal CK2 which is a pulse signal of a frequency defined by the capacity C2 and a resistor (not shown) having the same resistance as that of the resistor of the oscillator 31.

The CR oscillator 33 connected with the capacitor 2a of the reference unit 2 generates a clock signal CK3 which is a pulse signal of a frequency defined by the capacity CR and a resistor (not shown).

A frequency divider 34 divides the clock signal CK3 from the CR oscillator 33 to generate a plurality of divided signals having different divisional ratios. A timing generator 35 receives the plurality of divided signals and generates a plurality of timing signals. The timing signals include enable signals CK1EN and CK2EN controlling the oscillation of the oscillators 31 and 32, select signals S1 and S2, and an up-and-down signal UD.

A selector circuit 36 selects one of clock signals CK1, CK2 and CK3 generated from the oscillators 31, 32 and 33 in response to the select signals S1 and S2 to be generated from the circuit 36. For instance, the clock signal CK1 is selected when the select signals S1 and S2 are "0 and 1", the signal CK2 is selected when the signals are "1 and 0", and the signal CK3 is selected when the signals are "1 and 1". When the signals S1 and S2 are "0 and 0", any oscillation signal is not generated, and the output is kept a low level by being grounded by pull-and-down resistors.

An up-and-down counter 37 counts the pulse signal produced by the selector circuit 36 (hereinafter called as "clock signal CKIN") in response to the up-and-down signal UD. The counter 37 up-counts the clock signal CKIN when the signal UD is at a low level, and down-counts the signal CKIN when the signal UD is at a high level. When the counted value becomes "0", the counter produces a borrow signal BO at a low level to be applied to the timing generator 35 and the borrow signal BO is latched (the latched signal is hereinafter called as "borrow signal BO" for a simplified explanation) to be applied to the CR oscillator 33 as an enable signal CK3EN for oscillation control.

A gate circuit 38 passes the clock signal CKIN applied to the up-and-down counter 37 when an enable signal OEN produced from the timing generator 35 becomes active. An output terminal 39 applies the clock signal CKIN produced from the gate circuit 38 to the subsequent circuit 4 as an output pulse signal Pout.

Flip-flops and other components (not shown in drawings) providing the divider 34 and the up-and-down counter 37 are set to an initial state by a power-on reset signal XRST which will be explained later. In the initial state the counted value of the counter 37 is zero "0".

The CR oscillators 31 and 32 provides a first oscillation circuit for producing detection frequency signals (clock signals CK1 and CK2) defined by the electrostatic capacities C1 and C2 of the detection unit 1, and the CR oscillator 33 provides a second oscillation circuit for producing a reference frequency signal (clock signal CK3). The divider 34, the timing generator 35, the selector circuit 36 and the up-and-down counter 37 provide a measuring section (frequency measuring circuit 3X) for measuring the number of periods of the detection frequency signal within a predetermined period of the reference frequency signal to generate a measured signal.

Figure 9A:
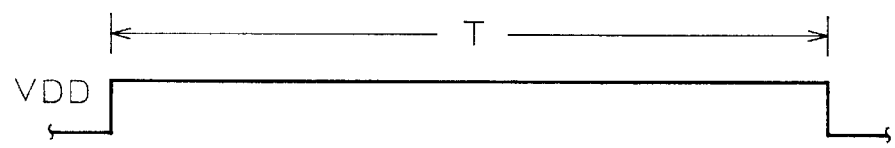
FIG. 9 (a) is a timing chart of a power source supplied to the circuit of FIG. 8.
FIG. 9(b) is a timing chart of an up-and-down counter employed in the circuit.
Figure 9B:
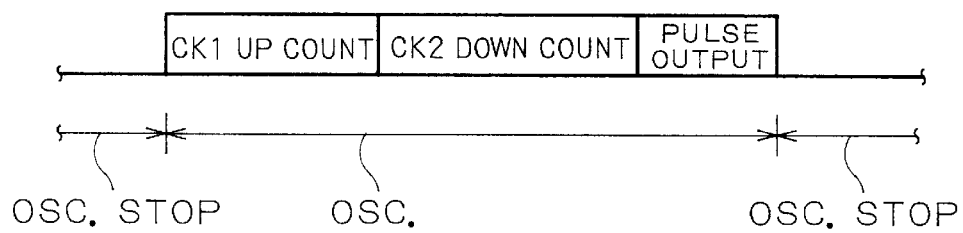

An operation of the diagram of FIG. 8 will be briefly explained hereinafter in conjunction with FIG. 9. FIG. 9(a) and FIG. 9(b) shows a timing chart when a power source $V_{DD}$ is applied to the circuit 3. FIG. 9 (b) shows a timing chart to explain a counting operation of the up-and-down counter 37. The action from the external is done by fluid pressure in this embodiment.

As the detection unit 1 turns to a biased state, the capacity C1 becomes smaller than the capacity C2, so that the frequency of the clock signal CK1 from the oscillator 31 becomes higher than that of the clock signal CK2 from the oscillator 32. As shown in FIG. 9 (a), the counted value N1 when the pulse signal of the clock signal CK1 is up-counted in a time period (described later) becomes larger than the counted value N2 when the pulse signal of the clock signal CK2 is down-counted in the same time period. In other words, the remaining value Nd in the counter 37 after down counting is Nd=N1−N2. The pulse signal of the clock signal CK3 is down counted until the borrow signal BO becomes a low level, whereby a number Nd of output pulse signals can be sent out as a magnitude of fluid pressure.

As shown in FIG. 9 (a), the period for counting is an oscillation mode where one of the CR oscillators is oscillated, and the period for stopping such counting is an oscillation stop mode (hereinafter is called as "sleep mode"). When other oscillator than the oscillator 33 does not serve any counting in the oscillation mode, the oscillation stops and the consumed power is saved.

FIGS. 10(a)–10(h) show a timing chart of signal wave forms within the circuit diagram of FIG. 8 to explain a detailed operation thereof. The respective signal wave forms are represented by the same marks as those of signals in circuit diagram.

As a power on reset signal XRST (FIG. 10 (a)) turns to a high level in the chart of FIG. 10(a), the borrow signal BO turns to a high level and the oscillator 33 starts its oscillation, and the clock signal CK3 is applied to the divider 34. The divided signal from the divider 34 applies the enable signal CK1EN, which is turned to a high level by the fall of the second pulse signal in the clock signal CK3 shown in FIG. 10 (b), to the OSC oscillator 31 from the timing generator 35. Simultaneously, the up-and-down signal UD turns to a low level, and the up-and-down counter 37 is brought to a position ready for up-counting.

Upon the fall of the fourth pulse signal of the clock signal CK3, the select signals S1 and S2 applied to the select circuit 36 are set to "0 and 1", the clock signal CK1 is applied to the counter 37 as the clock signal CK1N to initiate an up counting. Upon the fall of the 511th fall of the clock signal CK3 the enable signal CK1EN turns to a low level to stop the oscillation of the oscillator 31, viz., the clock signal CK1 is up-counted during the period where 508 pulses of the clock signal CK3 are entered. In this state, the counted value of the counter 37 which has finished up-counting is "N1". Upon the stop of the oscillation, the up-and-down signal UD turns to a high level, and the counter 37 turns to a state ready for counting.

Thereafter, the enable signal CK2EN brought to a high level upon the fall of the 513th pulse signal of the clock signal CK3 is applied to the oscillator 32 from the timing generator 35. Upon the fall of the 515th pulse of the clock signal CK3, the select signal S1 and S2 turn to "1 and 0" to be applied to the select circuit 36, the clock signal CK2 is applied to the counter 37 as the clock signal CK1N to initiate down-counting. Upon the fall of the 1022th pulse of the clock signal CK3, the enable signal CK2EN turns to a low level to stop the oscillation of the oscillator 32. Thus, the clock signal CK2 is down-counted during the period when 508 pulses of the clock signal CK3 are entered as executed in the up-counting. The counted value N1 of the counter 37 is decreased for each down-counting. In this state, the total number of the down counting when down-counting has be finished is "N2". The counted value Nd remaining in the counter 37 is "Nd=N1−N2".

Then, upon the fall of the 1024th pulse of the clock signal CK3, the select signals S1 and S2 turn to "1 and 1", and the clock signal CK3 is applied to the counter 37 as clock signal CK1N to initiate down-counting. At the same time, the enable signal OEN to be applied to the gate circuit 38 from the timing generator 35 becomes active, and the signal CK3 is generated from the output terminal 39 as an output pulse signal $P_{out}$.

The down-counting of the clock signal CK3 continues to be executed until the counted value Nd remaining in the counter 37 becomes "0" because, when the counted value of the counter becomes "0", the borrow signal BO becomes a low level to stop the oscillation of the oscillator 33.

Accordingly, the counted value Nd is produced by the difference between the capacities C1 and C2 of the detection unit 1, viz., the magnitude of the fluid pressure, so that the magnitude of the fluid pressure can be detected by applying Nd output pulses to a microprocessor (not shown in drawings) for calculation.

In this first embodiment, the detection unit 1 and the reference unit 2 are disposed under the same circumstances, so that the detection error can be extremely reduced even when the circumstances change, viz., when the dielectric constants of the capacitors 1a and 1b of the detection unit 1 are changed by the change of chemical components of the fluid of the fluid pressure to be detected.

Assuming that the capacities C1 and C2 of the capacitors 1a and 1b increase by 30% in accordance with the change of the dielectric constant, the frequencies of the pulse signals of the clock signals CK1 and CK2 reduce and the number of the pulses counted by the counter 37 in a time period decreases by 30%. The capacity CR of the capacitor 2a of the reference unit 2, however, increases by 30% as well with decreasing the frequency of the clock signal CK3, and the time period for entering 508 pulses of the clock signal CK3 is elongated by 30%, so that the detection error accompanied by the change of the dielectric constant can be canceled.

The change of the electrostatic capacities are directly converted into pulse signals (digital signals) without being converted into any analog signals. Accordingly, any amplifiers for amplifying analog signals and A/D converters for converting analog signals into digital signals are not required, whereby this circuit construction is simplified and made at a reduced cost. Moreover, this circuit can avoid the detection error affected by temperature drift, humidity drift and fluctuation of the power voltage.

The circuit of the gate array 3 is made by an integrated circuit (IC), and disposed on a very small area of silicon as a material of the IC, so that the threshold level of gates composing the oscillation circuits of the oscillators 31, 32 and 33 can be uniformed and the oscillation conditions such as oscillation frequencies can be the same.

Figure 11:
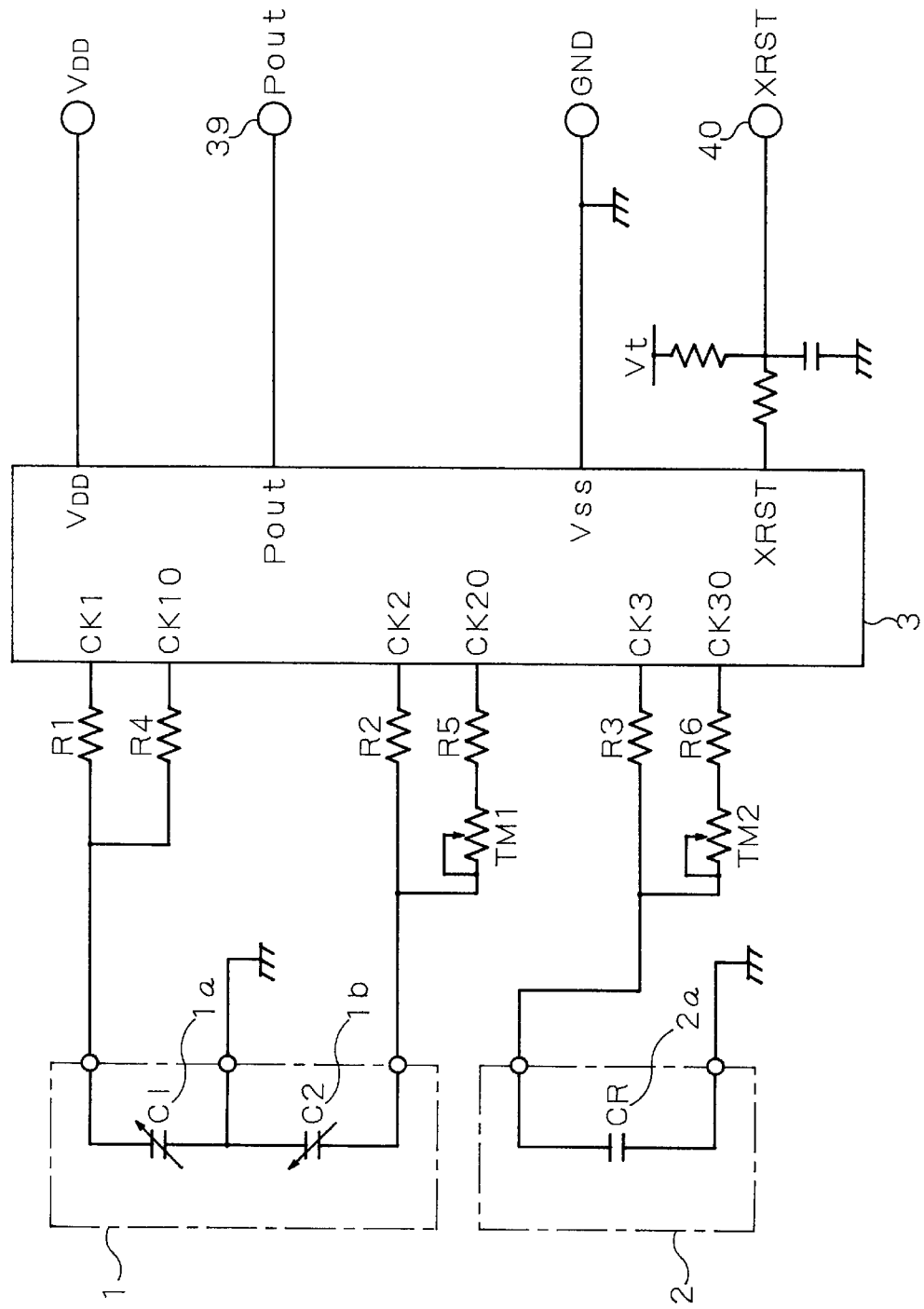
FIG. 11 is a block diagram of a circuit for adjusting an oscillation frequency.

The detection precision can be extremely improved by employing an oscillation adjuster as shown in FIG. 11 as a modification of this embodiment. In FIG. 11, there are disposed resistances R1 and R4, resistances R2, R5 and a semi fixed resistance (hereinafter, called as "trimmer") TM1 which are respective constants for defining oscillation frequencies in cooperation with capacitors 1a, 1b and 2a.

As the gate array 3 is set to a testing mode, for instance, as a reset signal is applied to a power on-and-reset terminal 40, the clock signals CK1, CK2 and CK3 are generated from the output terminal 39 by single or by alternating for each a predetermined time period. Accordingly, the frequencies of the generated clock signals CK2 and CK3 may be adjusted to be the same as the frequency of the clock signal CK1 by adjusting the trimmers TM1 and TM2 by manually or by automatically with an adjusting means.

Figure 12:
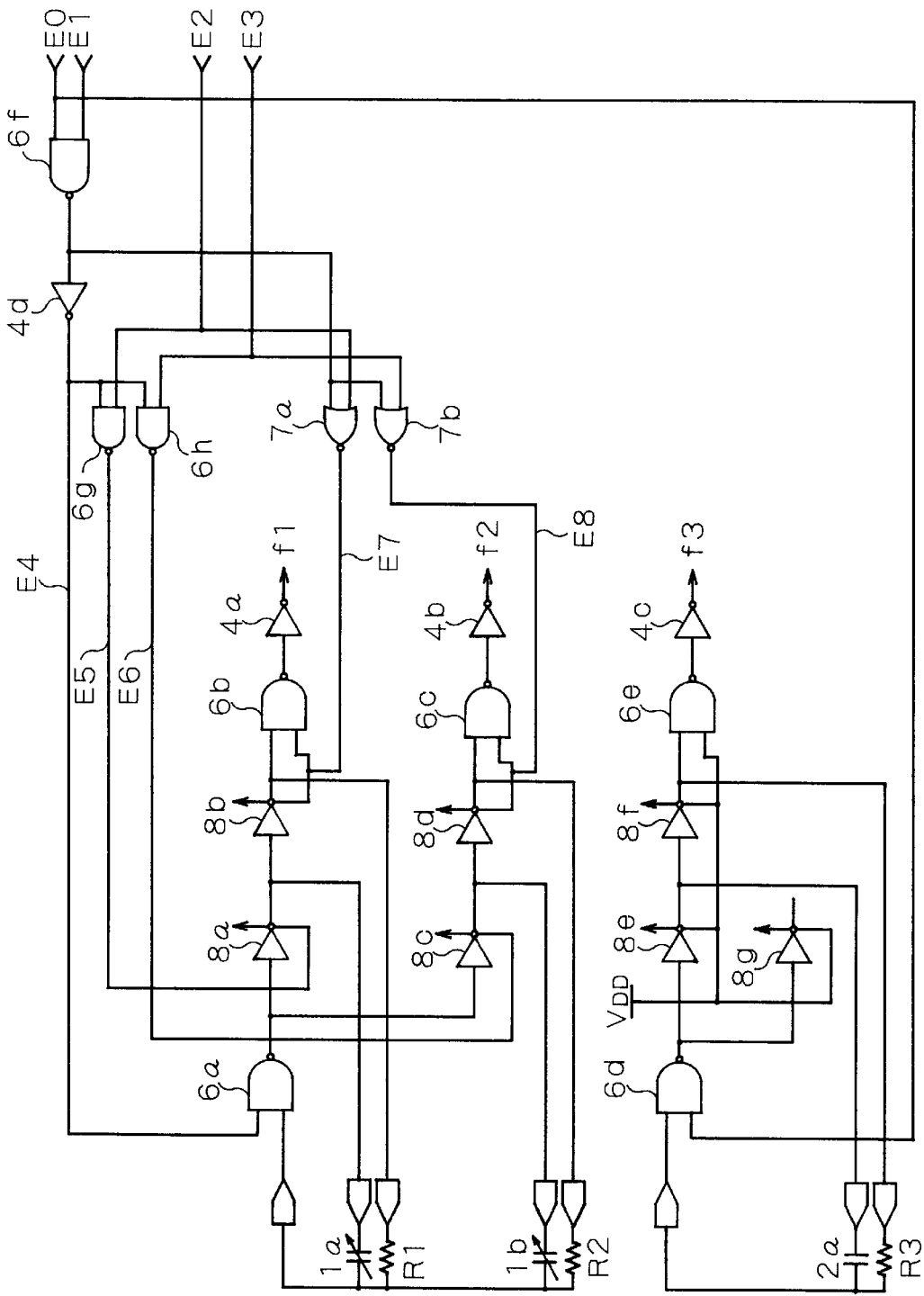
FIG. 12 is a detailed circuit diagram of a CR oscillator employed in the circuit of FIG. 8.

FIG. 12 is a detailed circuit diagram of the CR oscillators 31, 32 and 33, the detection unit 1 and the reference unit 2, which is suitable for the electrostatic capacity detection circuit composed of a CMOS gate array.

In FIG. 12, first, external components will be described hereinafter in conjunction with FIG. 2. Variable capacitors 1a and 1b, and a fixed capacitor 2a provides detection unit 1 for detecting external pressure. The capacitors 1a and 1b are composed of stationary electrodes 55 and 59 and movable electrode 57 disposed therebetween. The capacitor 2a represents reference unit 2, which is composed of stationary electrodes 62 and 64. The capacity of the capacitor 2a is not changed against any external action, but the capacities of the capacitors 1a, 1b and 2a are changed when their dielectric constants are changed by peripheral circumstance.

Resistances R1, R2 and R3 are externally connected solid resistors, and compose time constants together with the capacitors 1a, 1b and 2a for defining oscillation frequencies. The stationary electrodes composing the capacitors 1a and 1b are wired to a terminal of the gate array 3 by a lead wire. The movable electrode 57 is connected with a terminal of the gate array 3 as a common terminal of the detection unit 1 together with one ends of the resistances R1 and R2. The stationary electrodes 62 and 64 of the capacitor 2a of the reference unit 2 are respectively connected with terminals of the gate array. The resistance R3 at one end thereof is connected with a terminal of the gate array 3, and at the other end thereof is connected with one stationary electrode of the capacitor 2a.

Next the internal circuit of the gate array 3 will be described hereinafter. In FIG. 12, there are shown inverter circuits 4a through 4d, two input NAND circuits 6a through 6h, two input NOR circuits 7a and 7b, and clocked gate circuits 8a through 8g. It is desirable to have these gates provided with the same transistor capacity and construction.

Figure 13A:
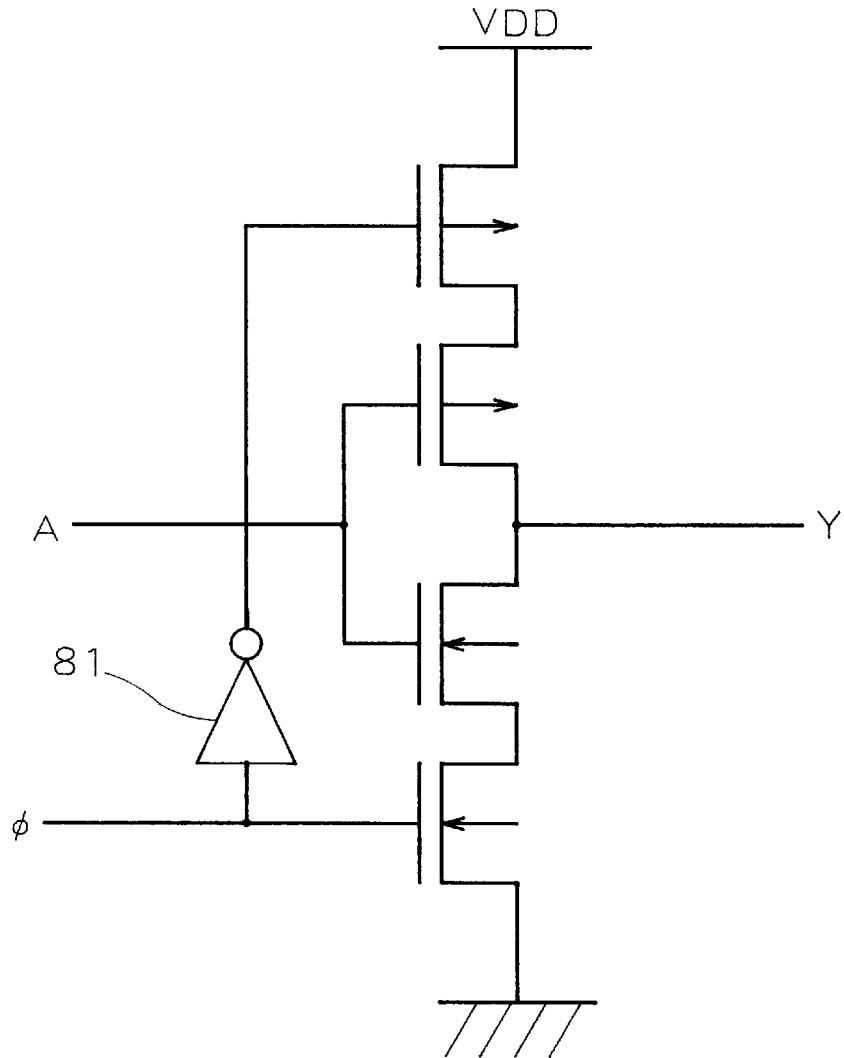
FIG. 13 (a) shows a clock gate circuit employing a CMOS semiconductor, and FIG. 13 (b) shows an equivalent circuit of the clock gate circuit.
Figure 13B:
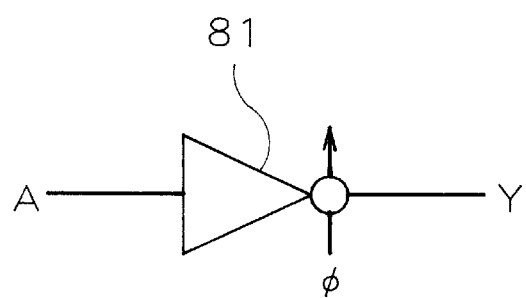

FIG. 13 (a) and FIG. 13(b) shows clocked gate circuits composed of CMOS semiconductors. FIG. 13 (a) is an internal circuit thereof, and FIG. 13 (b) is an equivalent circuit thereof. In FIG. 13 (a), when the clock signal ø is at a high level, the gate circuit is in an inverting operation, and its output signal Y is a signal inverted of an input signal A. When the clock signal ø is at a low level, the output becomes a high impedance, and is cut off from the input signal. An inverter 81 inverting the clock signal ø is composed of a pair of CMOS transistors. Therefore, the clocked gate circuits can be composed of six CMOS transistors with a simplified construction, whereby construction for gate array is easily performed with a reduced cost. Uneven in its production is smaller than analog switches, and its productivity for a mass production is improved. Since reversal between the inverting state and the high impedance state is at a high speed, the high speed clock signal ø can be driven.

NAND circuits 6a and 6b, clocked gate circuits 8a and 8b and inverter circuit 4a provide a first oscillation section which generates an oscillation signal having a frequency f1 according to a time constant defined by capacitor 1a and resistance R1. Likewise NAND circuits 6a and 6c, clocked gate circuit 8c and 8d and inverter circuit 4b provide a second oscillation section which generates an oscillation signal having a frequency f2 according to a time constant defined by capacitor 1b and resistance R2. NAND circuits 6d and 6e, clocked gate circuits 8e, 8g and 8f, and inverter circuit 4c provide a third oscillation section which generates a reference oscillation signal having a fixed frequency f3 according to a time constant defined by capacitor 2a and resistance R3.

Clock signal input terminals for the clocked gate circuits 8e, 8f and 8g in the third oscillation section are pulled-up toward an electric source, and the inverter circuit is always constructed. The clocked gate circuit is disposed to equalize the load capacities of the NAND circuit 6d to the load capacities of the NAND circuit 6a in the first and the second oscillation sections for equalization of the characteristics of the respective oscillation sections. The common use of the first step NAND circuit 6a in the first and second oscillations is for the same reasons.

It equalizes the input incident capacities of the respective oscillation circuits and reduces its oscillation error that the first step NAND gate is commonly used in the first and the second oscillation sections.

The gate circuits of NAND circuits 6f, 6g and 6h, inverter circuit 4d and NOR circuits 7a and 7b receive, at control terminals of the oscillation circuits, pulse signals E0, E1, E2 and E3 which are control signals from a timing generator (not shown) in the gate array, and generate pulse signals E4 to E8 to define oscillation conditions for the first, second and third oscillation sections. The reference signal for these pulse signal is the reference oscillation signal of frequency f3 generated from the third oscillation section.

An operation of the oscillation circuit in FIG. 12 will be described in conjunction with a timing chart of pulse signals E0–E8 of FIG. 14. TABLE 1 shows oscillation state about pulse signals E0, E1, E2 and E3 at the control terminals of the oscillation circuit.

TABLE 1

| STATE OF OSCILLATION CIRCUIT | E0 | E1 | E2 | E3 | CORRESPONDING PERIOD |
|---|---|---|---|---|---|
| ALL STOP | L | * | * | * | T6 |
| ELECTRIC CHARGE EQUALIZATION | H | L | * | * | T1, T3, T5 |
| OSCILLATION OF FIRST OSC. SECTION | H | H | L | H | T2 |
| OSCILLATION OF SECOND OSC. SECTION | H | H | H | L | T4 |
| OSCILLATION OF THIRD OSC. SECTION | H | * | * | * | T1–T5 |
| INHIBITION | H | H | H | H | |

Figure 14:
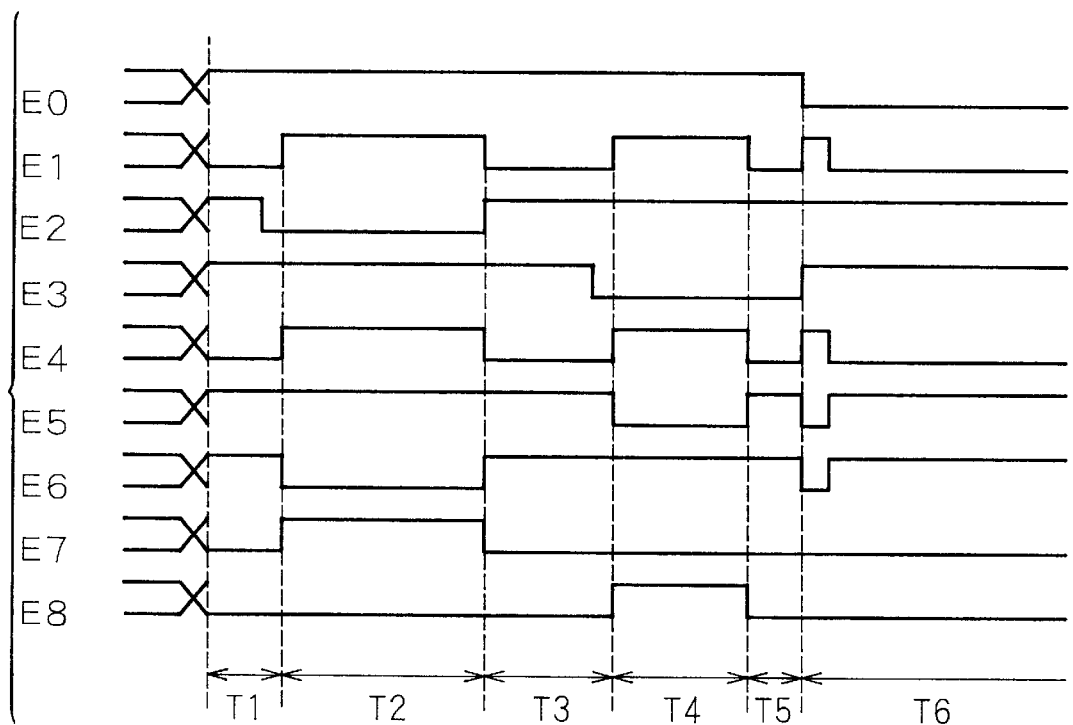
FIG. 14 shows pulse wave forms illustrating a timing chart of pulse signals in the circuit of FIG. 12.

When the pulse signal E0 is at a low level "L", NAND circuits 6a and 6d are non-active and all oscillations stop irrelevant to state of other pulse signals (period T6 of FIG. 14).

As the pulse signal E0 is at a high level "L", NAND circuit 6d becomes active, the third oscillation section is in an oscillation, and the reference oscillation signal of frequency f3 is generated (period T1–T5 of FIG. 14).

When the pulse signal E0 is "H", the signal E1 is "H", the signal E2 is "L" and the E3 is "H", the pulse signals E5 and E7 which are clock signals ø of the clocked gate circuits 8a and 8b become "H". In the period T2 of FIG. 14, the first oscillation section is in an oscillation state. In this period, the clocked gate circuits 8c and 8d are cut off to stop the oscillation of the second oscillation section because the pulse signals E6 and E8 as the clock signals ø for the clocked gate circuits 8c and 8d become "L".

When signal E0 is "H", signal E1 is "H", signal E2 is "H" and signal E3 is "L", the pulse signals E6 and E8 as clock signals ø for the clocked gate circuits 8c and 8d become "H". In this period, the clocked gate circuits 8a and 8d are cut off to stop the oscillation of the first oscillation section because the pulse signals E5 and E7 of clock signals ø become "L".

When the pulse signal E0 is "H" and signal E1 is "L", the clocked gate circuits 8a and 8c become active because the signals E5 and E6 are "H". Moreover, the gate circuits 8b and 8d become cut off because the signals E7 and E8 are "L". In the periods T1, T3 and T5 of FIG. 14 at this state, the gate circuits 8b and 8d are cut off and the common terminal connected with capacitors C1 and C2 is in an open state. Other terminals of the capacitors C1 and C2 respectively have the same potential. Thus, when an oscillation state is switched from one oscillation section to other oscillation section, unevenness of the starting time of the oscillation operations can be overcome by employing time periods T1, T3 and T5 and equalizing the electric charge remaining in the capacitors C1 and C2.

When the pulse signals E0, E1, E2 and E3 are "H", the signal E4 becomes "H" and the NAND circuit 6a applied thereby become active though not shown in FIG. 14. However, this state must be avoided because the clocked gate circuits 8a, 8b, 8c and 8d become a cut off state and the other input of the NAND circuit 6a becomes open.

Figure 15:
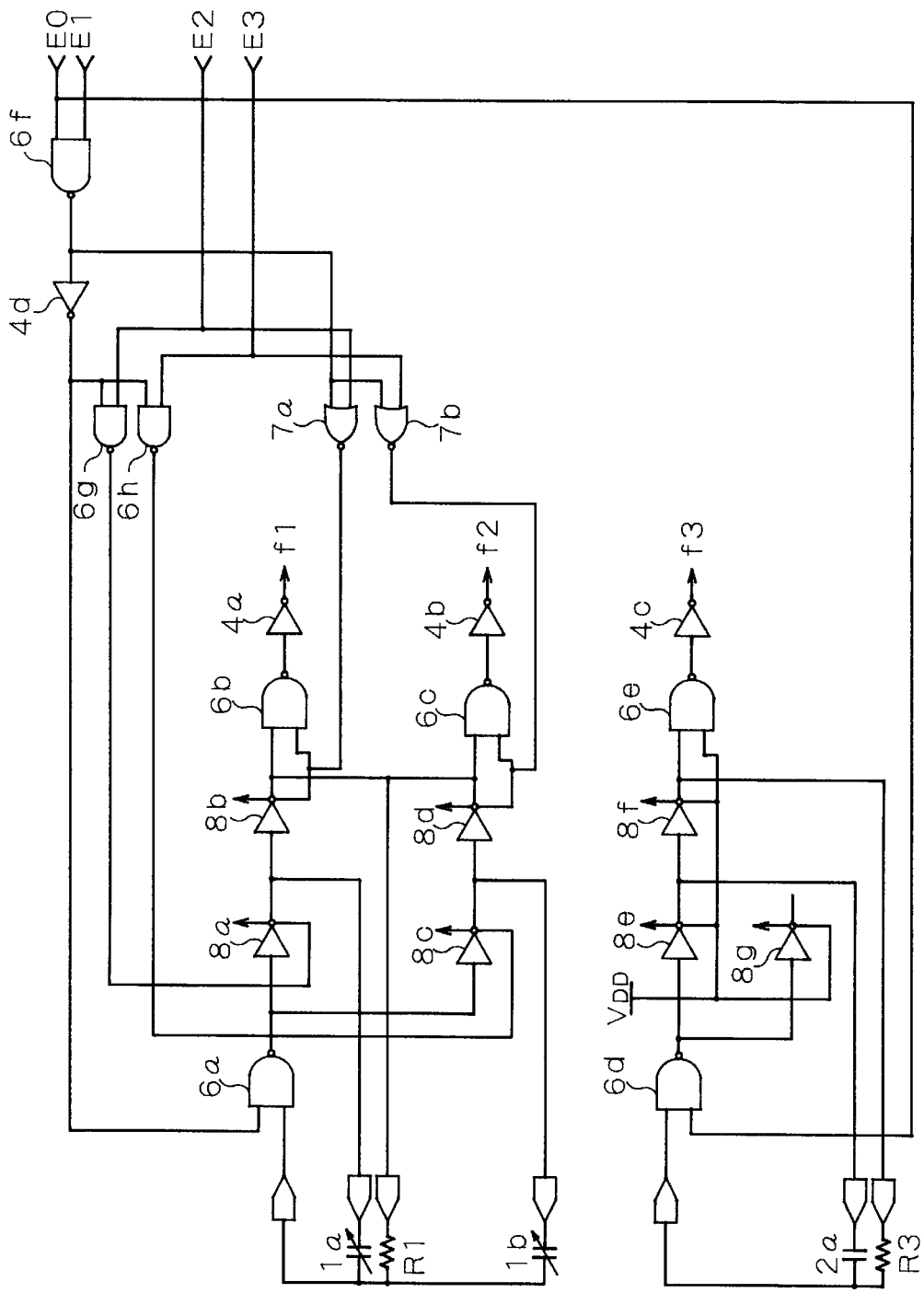
FIG. 15 is a circuit diagram of a CR oscillator modified from the circuit of FIG. 12.

FIG. 15 shows a circuit diagram of a CR oscillator as a modification of the oscillator of FIG. 12. Though the oscillator of FIG. 12 has the external resistances R1 and R2 respectively connected with the first and second oscillation sections for defining oscillation frequencies, the oscillator of FIG. 15 has a single resistance R1 for common use so that error of frequencies of the first and second oscillation sections caused by the unevenness of the pair of resistances can be further decreased.

Other constructions, timing charts of FIG. 14 and TABLE 1 of the oscillator of FIG. 12 are employed in the oscillator of FIG. 15 as they are, and the explanation thereabout is omitted for simplification.

Thus, the capacity detection circuit of this embodiment is provided with the pair of oscillation sections including clocked gate circuits which become inverters or high impedance output state by clock signals, in which as the oscillation signal of frequencies respectively defined by capacities and resistances is generated, the respective oscillation sections start or stop their oscillation in response to the clock signals applied thereto, so that any high precision power source is not required and the oscillator hardly affected by fluctuation of the external circumstances can be provided at reduced cost.

By employing the oscillation sections for generating oscillation signals of frequencies defined by the respective capacities and resistances and the circuits equalizing the electric charge quantities of the capacitors having the electrostatic capacitances in response to clock signals, the equalization of electric charge quantities remained in the capacitors can be performed prior to the initiation of the oscillation and high speed detection of capacities can be performed because the oscillation operation is quickly stabilized when the oscillation is switched from one oscillation section to other oscillation section.

Though the oscillators of FIGS. 12 and 15 employ a pair of oscillation sections (excluding the third oscillation section as a reference oscillation section) suitable for an electrostatic capacity detection circuit, n units of oscillation sections may be employed to detect more than two points of pressure, in which a desired oscillation is performed by switching the oscillation sections for the detection and the reference oscillation section at a high speed so that the respective points of pressure can be subsequently detected. The construction employing the clocked gate circuits of this embodiment is very suitable for such electrostatic capacity detection circuit, and has many advantages.

When the oscillators are composed of an ordinal LSI or room is available to an consuming current of the gate array, other similar oscillation circuits than the clocked gate circuits may be constructed.

Figure 16:
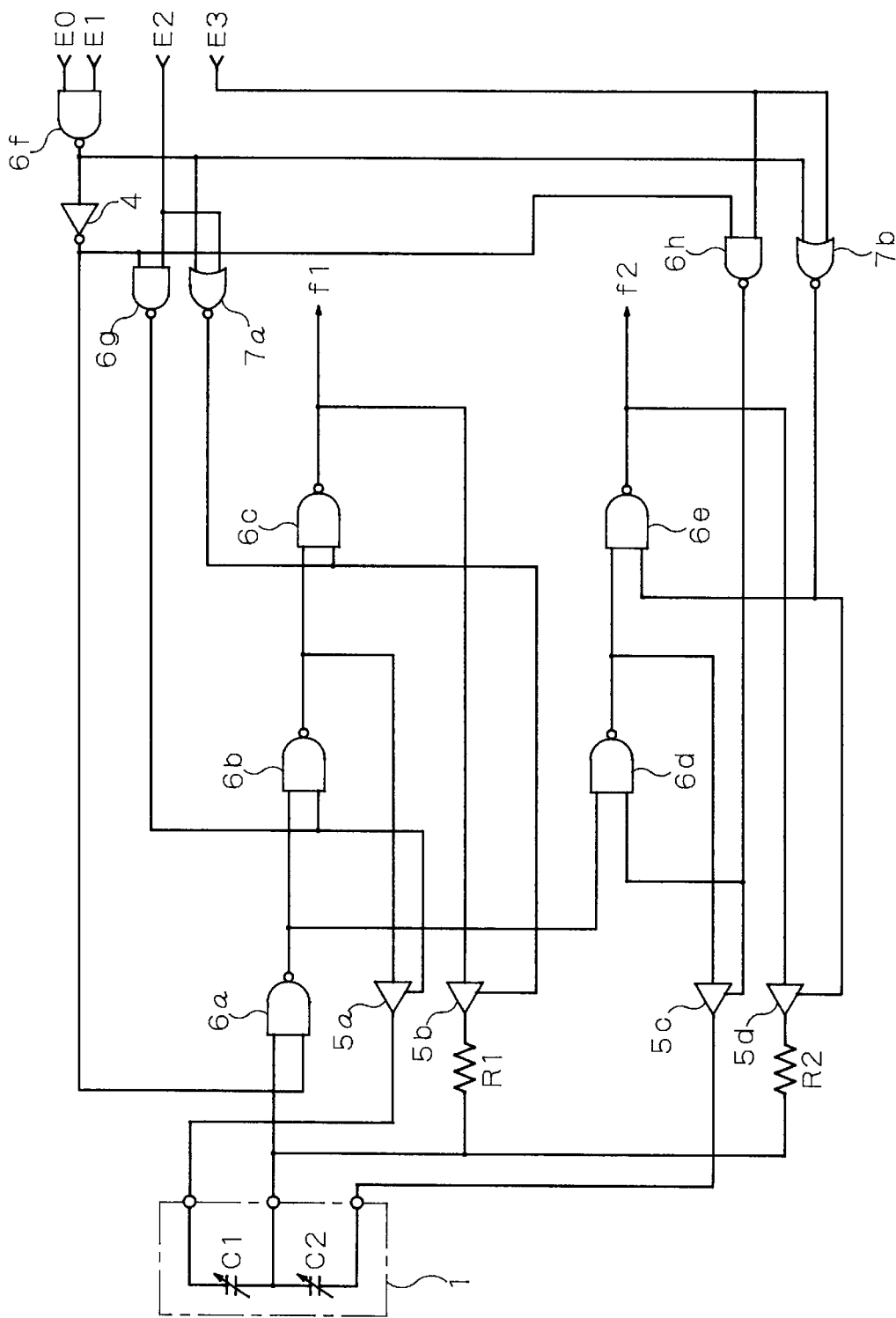
FIG. 16 is a circuit diagram of another modified CR oscillator emplyoing a tri-state buffer.

In FIG. 16 there is shown a circuit for a CR oscillator employing a tri-state buffer which is an I/O cell instead of the clocked gate circuit. This oscillation circuit consumes a larger current than that of the clocked gate circuit, but is easier to be composed by a gate array at a reduced cost. The detection unit 1 of FIG. 16 has the same construction of those mentioned above. Other construction, timing charts of FIG. 14 and TABLE 1 as shown in FIG. 12 are employed in this circuit of FIG. 16 without changes, and their explanation is omitted.

Figure 17:
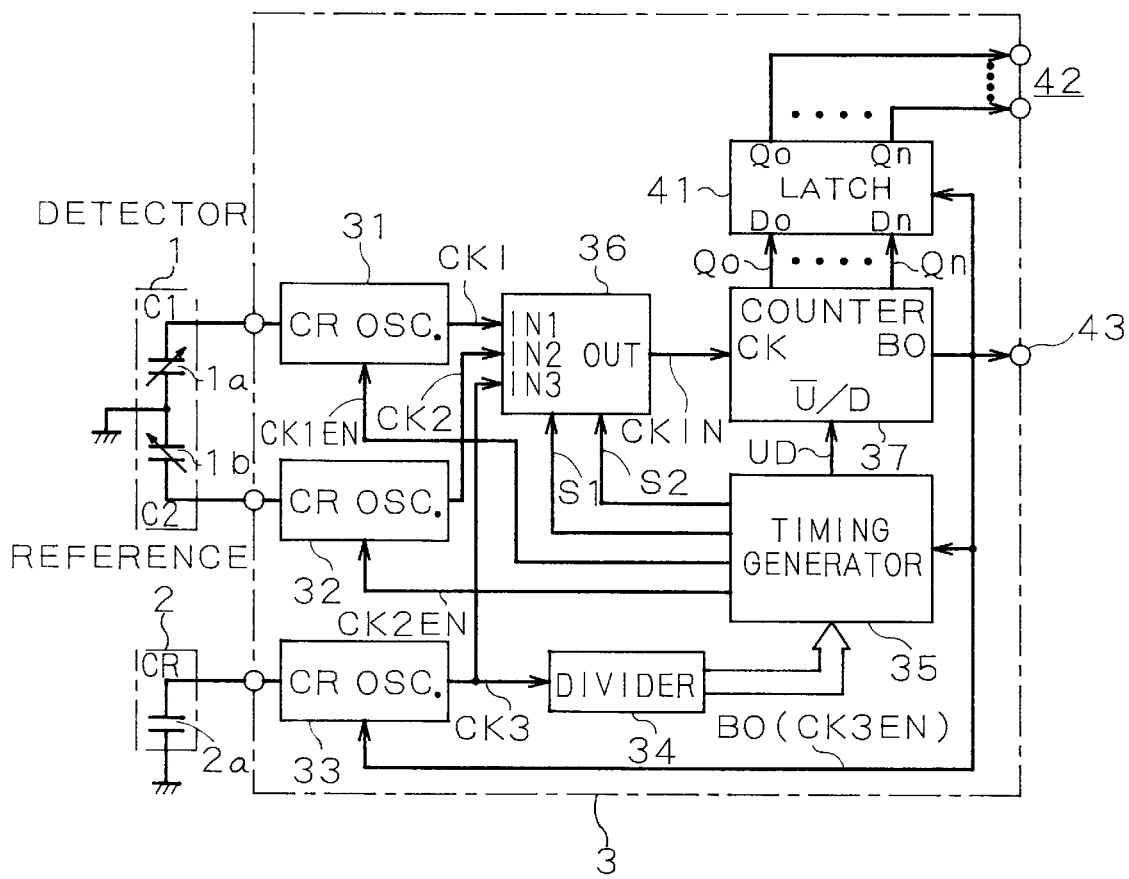
FIG. 17 is a block diagram of a modified electrostatic capacity detection circuit employed in the pressure sensor of this embodiment.

FIG. 17 shows a second modification of the electrostatic capacity detection circuit of this embodiment. In FIG. 17, the same components as those of the circuit of FIG. 8 are represented by the same referenced numbers, and the explanation thereof is omitted. The characteristics of this modification is that pulse outputs of the circuit 3 are parallel. In FIG. 17, there is shown an output latch circuit 41 which is designed to latch pulse signal data Q1, Q2, . . . , Qn subsequently produced from up-and-down counter 37 to produce parallel data of n bits through parallel output terminals 42 for application to a subsequent component (not shown in drawings). A terminal 43 is disposed to send out a borrow signal as a measurement finish signal upon the completion of measurement. In this modified embodiment, the measured data can be transmitted at a high speed, and is possible to be directly connected with a data bus composed of a plurality of bits of a microcomputer.

Figure 18:
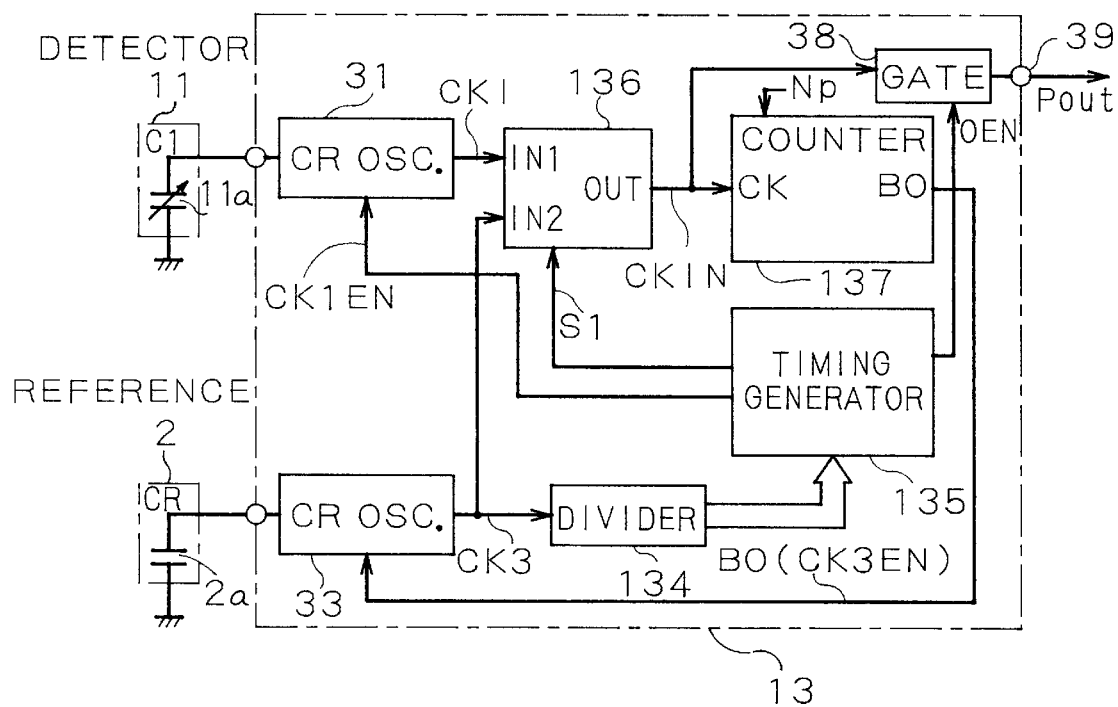
FIG. 18 is a block diagram of another modified electrostatic capacity detection circuit employed in the pressure sensor.

FIG. 18 shows an electrostatic capacity detection circuit as a third modification of this embodiment. In FIG. 18, the same components as those of the circuit of FIG. 8 are represented by the same referenced numbers, and the explanation thereof is omitted. This modification is characterized in that a detection unit or detector 11 is composed of a single capacitor 11a. Though not shown in drawings, the detection unit 11 is composed of a stationary electrode and a movable electrode directly connected with a plunger which is biassed toward the stationary electrode in response to oil pressure to vary (increase) electrostatic capacity C1 of the capacitor 11a.

Accordingly, a circuit section 13 includes only a single oscillation circuit (CR oscillator 31) connected with the detection unit 11, and a select circuit 136 for selecting two inputs. A counter for measuring frequencies is composed of a down counter 137 which is set to a predetermined preset value Np by power-on resetting. A divider 134 and a timing generator 135 are slightly different from those of FIG. 8.

In the circuit of FIG. 18, the capacity C1 of the capacitor 11a increases as fluid pressure is applied to the detection unit 11 as an external action. In a predetermined number of pulses (255 pulses) of clock signal CK3, the number of pulses of the clock signal CK1 which is supplied to counter 137 by select circuit 136 to be down-counted by the counter is set to "N1". Accordingly, the counted value remaining in the down-counter 137 on the completion of down-counting is "Np-N1". Upon the completion of down-counting, the oscillation of the CR oscillator 31 ceases by enable signal CK1EN.

As the clock signal CK3 is applied from select circuit 136 to down-counter 137 to be down-counted and the counted value becomes "0", borrow signal BO is applied to the CR oscillator 33 and its oscillation ceases. Upon initiation of down-counting of the clock signal CK3, the enable signal OEN produced from the timing generator 135 becomes active, and a total number of the counted pulses, viz., (Np-N1) pulses are supplied to an operation means such as a microcomputer (not shown) from output terminal 39 through the gate circuit 38.

The value N1 represents a magnitude of fluid pressure. The operational means reduces the value (Np-N1) from a previously known preset value Np to detect the magnitude of fluid pressure. Accordingly, in this modification, the CR oscillator 31 provides a first oscillation circuit for producing a detection frequency signal (clock signal CK1) in accordance with the electrostatic capacity of the detection unit 1, and the CR oscillator 33 provides a second oscillation circuit for producing a reference frequency signal (clock signal CK3) in accordance with an electrostatic capacity of the reference unit 2. A measuring section is presented by divider 134, timing generator 135, selector circuit 136 and down-counter 137, and produces a measuring signal by measuring the number (actually, difference from a predetermined value) of periods of the detection frequency signal within a predetermined period of the reference frequency signal.

This third modification can have same effects as that of the second modification, but further have advantages that the construction of the circuit section 13 is further simplified and a detection circuit is provided at a reduced cost.

Though the capacitor of the detection unit in the above-mentioned modifications has a construction in which a gap between stationary and movable electrodes is changed in response to fluid pressure, it may have a construction in which the movable electrode is shifted in response to fluid pressure without any change of its gap with the stationary electrode to change opposing area therebetween. In such a construction, the magnitude of the fluid pressure is proportional to the change of the capacity.

Though the external action is detected by the change of capacity in this embodiment, it may be detected by a construction in which it is detected as a change of inductance or light volume. The circuit of this invention can be widely applicable to the circuits for directly converting the analog quantity of the external action into change of frequencies.

Though in the above embodiments the circuit 3 is composed of a gate array including the oscillation circuit for producing the detection frequency signal and the reference frequency signal and the measuring section for measuring frequencies (periods) of these signals, it may be composed of a one chip microcomputer enclosing a microcomputer serving as an operational means in the circuit section as a fourth modification.

In this one chip microcomputer, a timer within the microcomputer counts the respective clock signals. For this purpose, the period of the reference frequency signal produced according to the capacity of the reference capacitor is counted by the precise clock signals from the timer, and as its results a time for measuring the detection frequency signals is defined. After that, the frequency measurement is executed in the same way as those of the above embodiments.

Thus construction enables the detection to be precise and a very simple and miniature measuring system to be manufactured at a reduced cost. By employing a construction for detecting the change of inductances and light volume in addition to the detection of capacity change, the measuring system as a wide range of measuring system has a good effect.

The pressure sensor of this first embodiment includes the detection unit 1 in which the capacities C1 and C2 are changed by a predetermined external action, the reference unit 2 in which the capacities CR is not changed by a predetermined external action, the first oscillation circuits 31 and 32 for producing a detection frequency signal in accordance with the capacities C1 and C2 of the detection unit, the second oscillation circuit 33 for producing a reference frequency signal in response to the capacity CR of the reference unit 2, and measuring section 3X for producing a measured signal by measuring the number of periods of the detection frequency signal within a predetermined period of the reference frequency signal.

In this first embodiment, the detection unit 1 and the reference unit 2 are disposed under the same circumstances, so that the detection error can be extremely reduced even when the circumstances change, viz., when the dielectric constants of the capacitors 1a and 1b of the detection unit 1 are changed by the change of chemical components of the fluid of the fluid pressure to be detected.

The change of the electrostatic capacities are directly converted into pulse signals (digital signals) without being converted into any analog signals. Accordingly, any amplifiers for amplifying analog signals and A/D converters for converting analog signals into digital signals are not required, whereby this circuit construction is simplified and made at a reduced cost. Moreover, this circuit can avoid the detection error affected by temperature drift, humidity drift and fluctuation of the power voltage.

The circuit of the gate array is made by an integrated circuit (IC), and disposed on a very small area of silicon as a material of the IC, so that the threshold level of gates composing the oscillation circuits of the oscillators can be uniformed and the oscillation conditions such as oscillation frequencies can be the same. The detection precision can be extremely improved by employing an oscillation adjuster.

In the oscillation circuit composed of gate array in this embodiment provided with a plurality of oscillation sections including clocked gate circuits which become inverters or high impedance output state by clock signals, in which as the oscillation signal of frequencies respectively defined by capacities and resistances is generated, the respective oscillation sections start or stop their oscillation in response to the clock signals applied thereto, there are advantages that any high precision power source is not required and the oscillator hardly affected by fluctuation of the external circumstances can be provided at reduced cost.

By employing the oscillation sections for generating oscillation signals of frequencies defined by the respective capacities and resistances and the circuits equalizing the electric charge quantities of the capacitors having the electrostatic capacitances in response to clock signals, high speed detection can be performed because high speed switching among the plurality of oscillation sections is possible.

Another construction employing a one chip microcomputer having a microcomputer as an operation means of a circuit section, enables the detection to be precise and a very simple and miniature measuring system to be manufactured at a reduced cost. By employing a construction for detecting the change of inductances and light volume in addition to the detection of capacity change, the measuring system as a wide range of measuring system has a good effect.

[Second embodiment]

Figure 19:
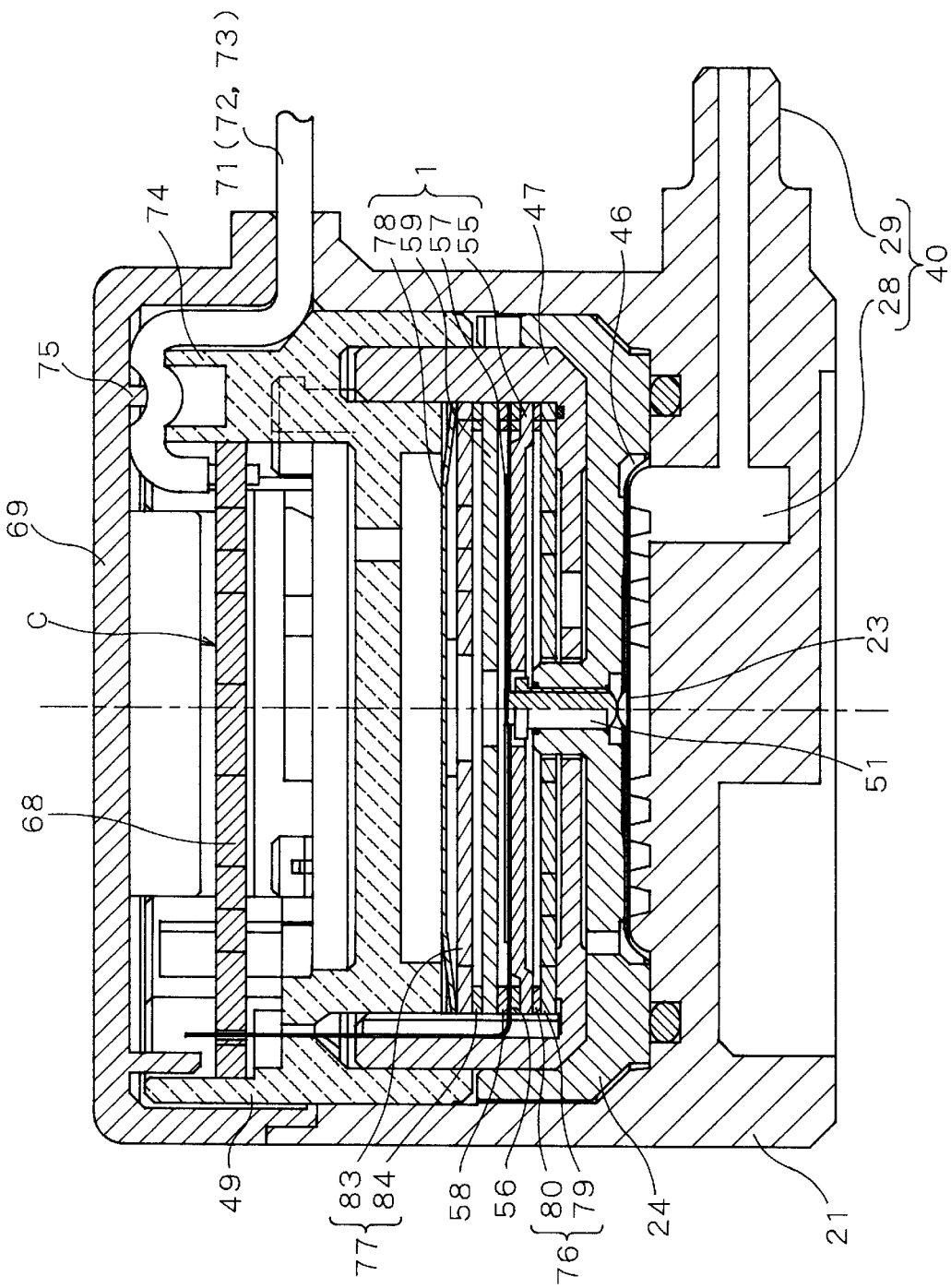
FIG. 19 is a longitudinal sectional view of a pressure sensor as a second embodiment of this invention.
Figure 20:
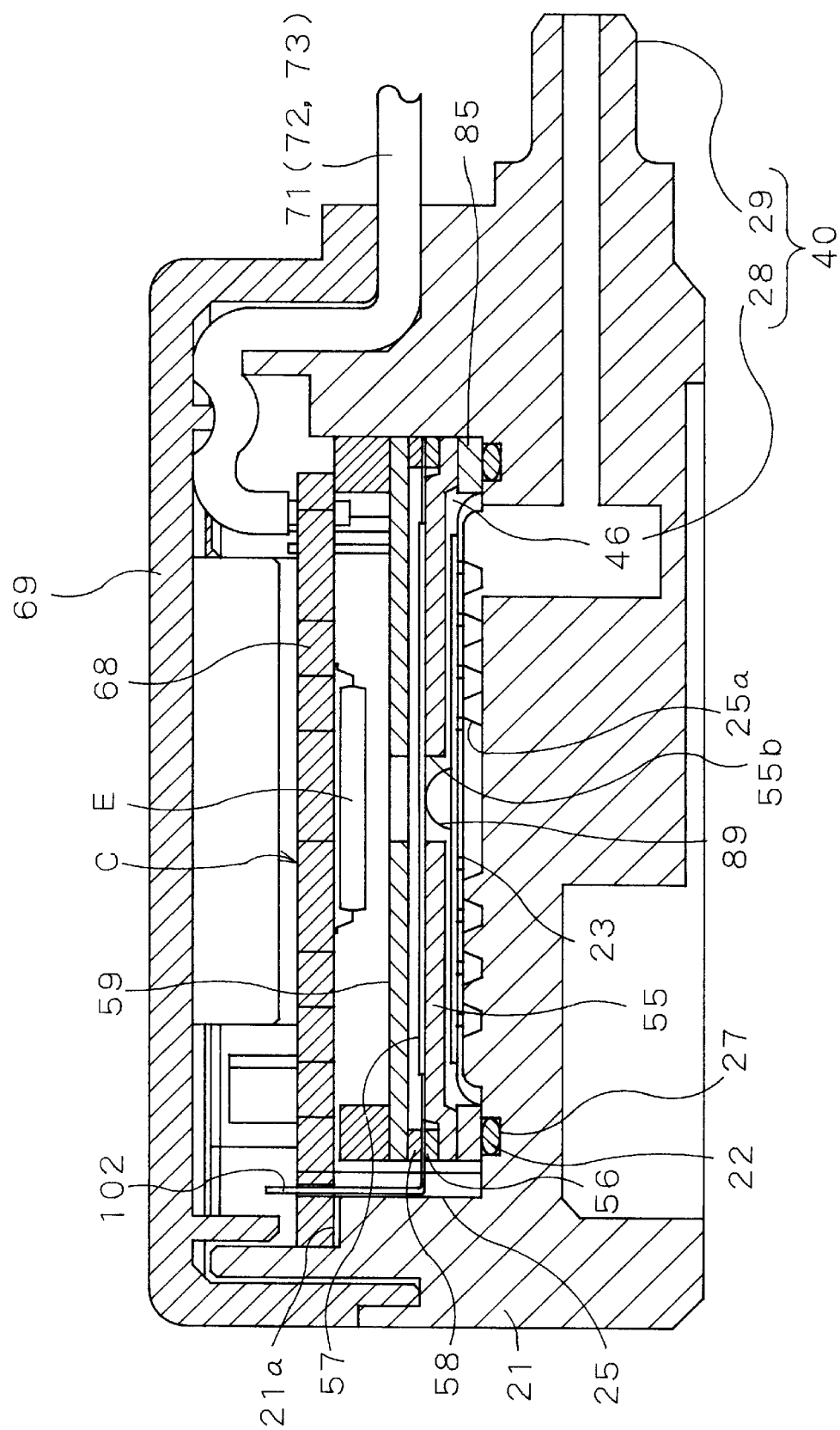
FIG. 20 is a longitudinal sectional view of a pressure sensor as a third embodiment of this invention.
Figure 21:
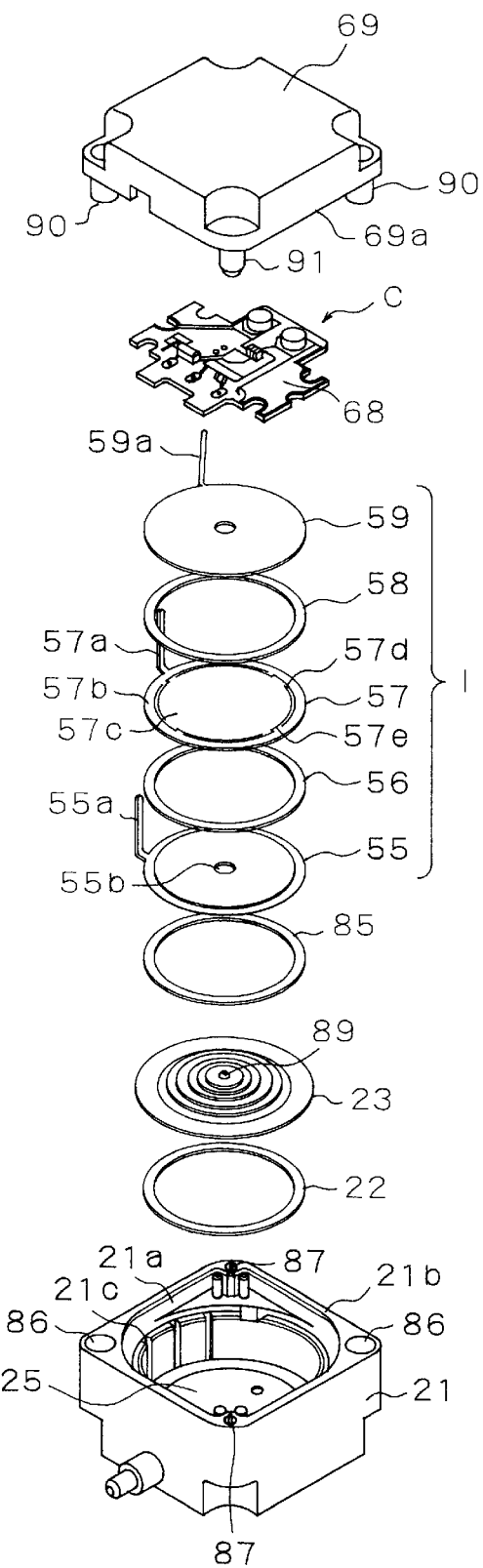
FIG. 21 is a perspective disassembled view of the pressure sensor of FIG. 20.
Figure 22:
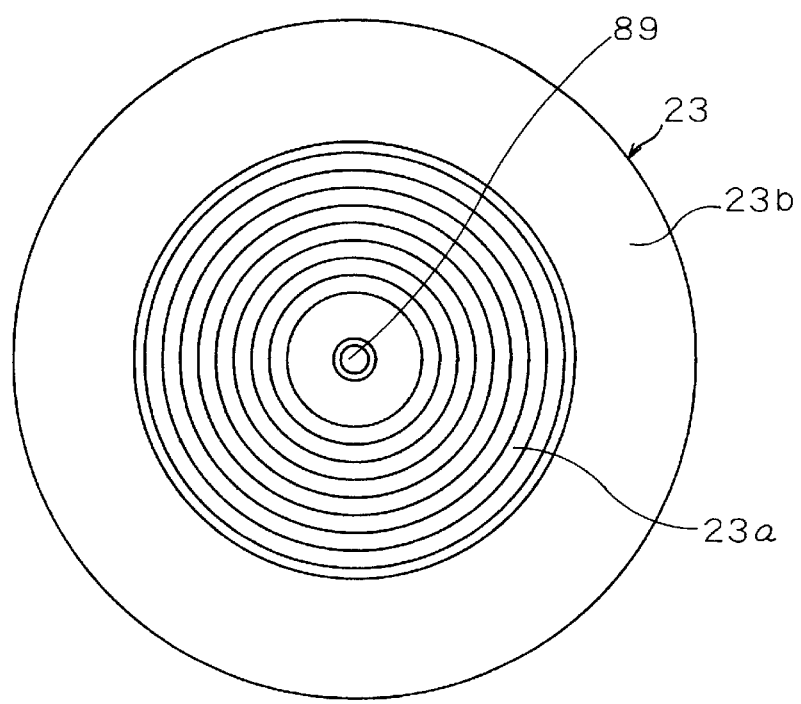
FIG. 22 is a plane view of a diaphragm employed in the pressure sensor of FIG. 20.
Figure 23:
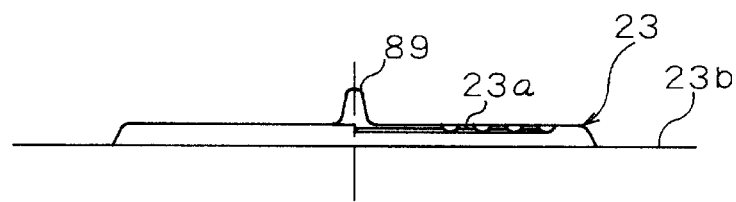
FIG. 23 is a partially sectional view of the diaphragm of FIG. 22.
Figure 24:
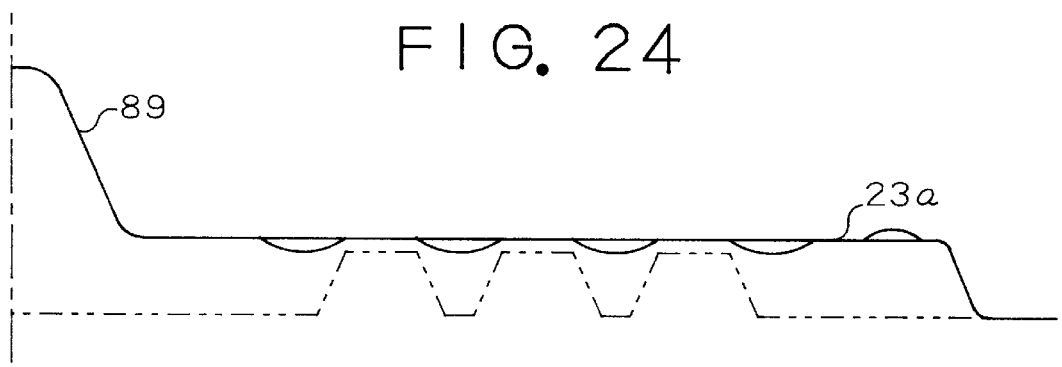
FIG. 24 is a sectional partial view of the diaphragm of FIG. 22.

In FIG. 19, there is shown a pressure sensor as a second embodiment of this invention. In this pressure sensor, the reference unit 2 of the first embodiment is represented by a fixed capacity element (capacity 2a) built into a signal processing unit C, electric field shield 76 and 77 are respectively disposed between electrode holder 47 and one stationary electrode 55 and between other stationary electrode 59 and electrode holder 49, a pressing spring 78 is disposed between the electric field shield 76 and the electrode holder 49, and a cover 69 is secured into base 21 by a press insertion means (for example, inserting a pressure insertion pin provided in the cover 69 into a pin hole provided in the base 21). Other components are the same as those of the above first embodiment.

The electric field shield 76 is composed of a disc shaped shield plate 79 and a disc shaped insulating film 80. The electric shield 77 is composed of a disc shaped shield plate 83 and a disc shaped insulating film 84. The detection unit 1 composed of two stationary electrodes 55 and 59 and movable electrode 57 includes an electrostatic capacity C1 of a capacitor 1a of a first sensor section composed of stationary electrode 55 and movable electrode 57 and an electrostatic capacity C2 of a capacitor 1b of a second sensor section composed of stationary electrode 59 and movable electrode 57. The reference unit 2 includes a reference electrostatic capacity CR of a capacitor 2a.

This pressure sensor of this embodiment includes a gate array having the same components in the gate array 3 of the above-mentioned first embodiment. The gate array includes the electrostatic capacity detection circuit as shown in FIGS. 6 and 8. As schematically shown in FIG. 6, there are disposed CR oscillators 31, 32 and 33 which generates signals of oscillation frequencies f1, f2 and fr defined by capacities C1, C2 and CR by connection with the detection unit 1 and the reference unit 2, and a frequency measuring circuit 3X which generates in one period of a reference oscillation signal from the oscillator 33 a pulse signal of difference between an oscillation frequency f1 at a first half period and an oscillation frequency f2 at a second half period. The pulse output circuit 4 amplifies and level adjusts the pulse signal supplied from the gate array 3. The pressure sensor of this embodiment has the above-mentioned construction, and other detailed explanation is omitted because of the same other components.

An operation of this pressure sensor will be described hereinafter.

When the pressure at the receiving side of the diaphragm chamber 46 is zero, the movable electrode 57 in the detection unit 1 is not biased and the capacities C1 and C2 are equal. Thus, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into diaphragm chamber 46 through inflow inlet 40, the diaphragm 23 is displaced upwardly in FIG. 19. The movable portion 57c of the movable electrode 57 is displaced upwardly by the plunger 51 displaced by the displaced diaphragm 23, and the capacities C1 and C2 have different capacitances. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array.

The capacities C1 and C2 are varied by the peripheral circumstances, viz., temperature, composition of materials of pressure fluid to be measured. The oscillation frequencies f1 and f2 in the oscillators 31 and 32 vary, but the capacity CR of the reference unit 2 also varies, so that the measurement error by change of circumstances can be resolved without any compensating circuit.

According to this second embodiment, there are provided the detection unit 1 having capacities C1 and C2 variable according to a predetermined external action, the reference unit 2 having capacity CR free from the external action, and the signal processing unit C for processing the capacities C1, C2 and C3 to generate a desired signal, in which the reference unit 2 is composed of the fixed capacity element (capacitor 2a) and the detection unit 1 is covered by the electric field shield 76 and 77, so that fluctuation of output by change of an external electric field can be avoided, detection error can be extremely reduced, the number and cost of components is reduced and its productivity is improved.

[Third Embodiment]

In FIGS. 20 through 24, there is shown a pressure sensor according to a third embodiment of this invention. The pressure sensor includes an element E (capacitor 2a) which is constructed into an element about the reference unit 2, and a board 68 of the signal processing unit C mounted by the element E, gate array 3 and pulse generating circuit 4, but does not employ diaphragm holder 24, electrode holder 47, spacer 48 and electrode holder 49.

Thus, the pressure sensor of this second embodiment is composed of base 21, O ring 22, diaphragm 23, diaphragm fixing ring 85, stationary electrode 55, disc-shaped insulating film 56, movable electrode 57, disc-shaped insulating film 58, stationary electrode 59, signal processing unit C, and cover 69.

Stationary electrode 55, insulating film 56, movable electrode 57, insulating film 58, and stationary electrode 59 provide the detection unit 1.

The base 21 is provided with a cylindrical chamber 25 having a circular section in a horizontal view and a circular bottom wall 25a which includes an O ring engagement groove 27 coaxial with the center of the bottom wall 25a. The bottom wall 25a further includes a recess portion 28 in a radius direction from the center of wall 25a and a connection tube 29 projecting from a side peripheral of the wall 25a which is internally connected with the recess portion 28, to provide an inflow inlet 40.

The base 21 includes a signal processing unit receiver 21a on an upper portion of the base, guide pin holes 86 at one opposite positions on an upper surface of the base 21, and pin insertion holes 87 at the other opposite positions. On an inner peripheral wall of the base 21 there are disposed a plurality of terminal insertion grooves 21c.

The diaphragm 23 made of metals is of a dish shape and includes a mounting portion 23b on a peripheral of a face 23a of thereof and a plunger portion 89 projecting from the center of the face 23.

The electrodes 55, 87 and 59 in the detection unit 1 are the same as those of the first embodiment.

The signal processing unit C includes a base 68 engageable with the receiver 21a of the base 21. The base 68 carries the gate array 3, the pulse output circuit 4, and the element E (capacitor 2a) having the reference capacity CR in the reference 2. The cover 69 is provided with guide pins 90 at one opposite positions on a lower contact surface of the cover with the base 21 and insertion pins 91 on the other opposite positions.

The O ring 22 is engaged with the O ring engagement groove 27 of the base 21. Within the chamber 25 of the base 21 there are enclosed the diaphragm 23 and the diaphragm hold ring 85. The diaphragm 23 is seated within a diaphragm chamber 46 formed by the chamber 25 and the diaphragm chamber 46 at its pressure receiving portion is communicated with the inflow inlet 40, providing the pressure receiving unit.

The chamber 25 encloses diaphragm holding ring 85, stationary electrode 55, insulating film 56, movable electrode 57, insulating film 58, and stationary electrode 59 in a piled-up fashion. The movable electrode 57 at its holding portion is sandwiched by the insulating films 58 and 56.

The signal processing unit C is enclosed within the receiver 21a of the base 21, and the terminals 55a, 57a and 59a are connected with the corresponding connection pattern portion of the board 68. The cover 69 is put over the board 68, and secured onto the base 21 by inserting the guide pins 90 into the guide pin holes 86 and the insert pins 91 into the insert holes 87, while lead wire 71 (72 and 73) is extended outwardly of the cover 69.

In thus constructed pressure sensor, one end of the plunger portion 89 formed on the diaphragm 23 comes into contact with movable portion 57c of movable electrode 57 from the bottom through plunger passing hole 55b disposed in stationary electrode 55.

The detection unit 1 composed of the pair of stationary electrodes 55 and 59 and one movable electrode 57 provides the capacitor 1a having the capacity C1 formed by the electrodes 55 and 57 as a first sensor section, and the capacitor 1b having the capacity C2 formed by the electrodes 59 and 57 as a second sensor section.

As schematically shown in FIG. 6, in the gate array 3 which has the same electrostatic capacity detection circuit as that shown in FIGS. 6 and 8, there are disposed CR oscillators 31, 32 and 33 respectively generating oscillation frequencies f1, f2 and fr which are defined by the electrostatic capacities C1, C2 and CR in connection with the detection and reference units 1 and 2 and resistances (not shown in drawings), and a frequency measuring circuit 3X which receives signals from the oscillators 31, 32 and 33 to generate in one period of the reference oscillation frequency fr from CR oscillator 33 a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Next, an operation of this pressure sensor of this third embodiment will be described hereinafter.

When the pressure at the receiving side of the diaphragm chamber 46 is zero, the movable electrode 57 in the detection unit 1 is not biased and the capacities C1 and C2 are equal. Thus, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into diaphragm chamber 46 through inflow inlet 40, the diaphragm 23 is displaced upwardly. The movable portion 57c of the movable electrode 57 is displaced upwardly by the plunger 89 displaced by the displaced diaphragm 23, and the capacities C1 and C2 have different capacitances. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The capacities C1 and C2 vary with the peripheral circumstances, viz., temperature, composition of materials of pressure fluid to be measured. The oscillation frequencies f1 and f2 in the oscillators 31 and 32 vary, but the capacity CR of the reference unit 2 also varies, so that the measurement error by change of circumstances can be resolved without any compensating circuit.

Since a differential sensing construction (detection unit 1) is employed in this third embodiment, its sensor linearity is hard to be affected by temperature and humidity. The performance is ensured by keeping a good precision of thickness of the insulating films 85 and 57, so that any special materials are not required and the sensor can be constructed with a reduced cost. The reference unit 2 is enclosed and the absolute values of characteristics can be compensated by circuits, so that any complicated process in operation such as correction of original points can be omitted.

In the detection unit 1, the stationary electrodes 55 and 59 and the movable electrode 57 are disposed to have the maximum effective area for mutual opposition for reduction of incidental capacity. The stationary electrode 59 may be designed to have a projection made of insulating materials for the purpose of prevention of electrical short by contact of the electrodes 59 and 57 when an overload is applied, or the movable electrode 57 may be coated with an insulating film instead of the projection for that purpose. Moreover, if desired, the housing (base 21 and case 69) may be covered by an external shield layer of metals to avoid the fluctuation of output of this sensor caused by external electrical field.

The pressure sensor of this third embodiment includes the pressure receiving unit for detecting the pressure of pressure fluid, the reference unit 2 composed of the element (capacitor 2a) having a fixed capacity, the detection unit 1 having stationary electrodes 55 and 59 and the movable electrode 57 supported between electrodes 55 and 59 which is movable in response to pressure detected by the pressure receiving unit and detecting the capacity C1 between the stationary electrode 55 and the movable electrode 57 and the capacity C2 between the stationary electrode 59 and the movable electrode 57, and the signal processing unit C for processing the capacities C1, C2 and CR in the units 1 and 2 to generate a desired signal, whereby the detection error can be reduced, the number of components is reduced, and its productivity is greatly improved with reduced cost.

[Fourth Embodiment]

Figure 25:
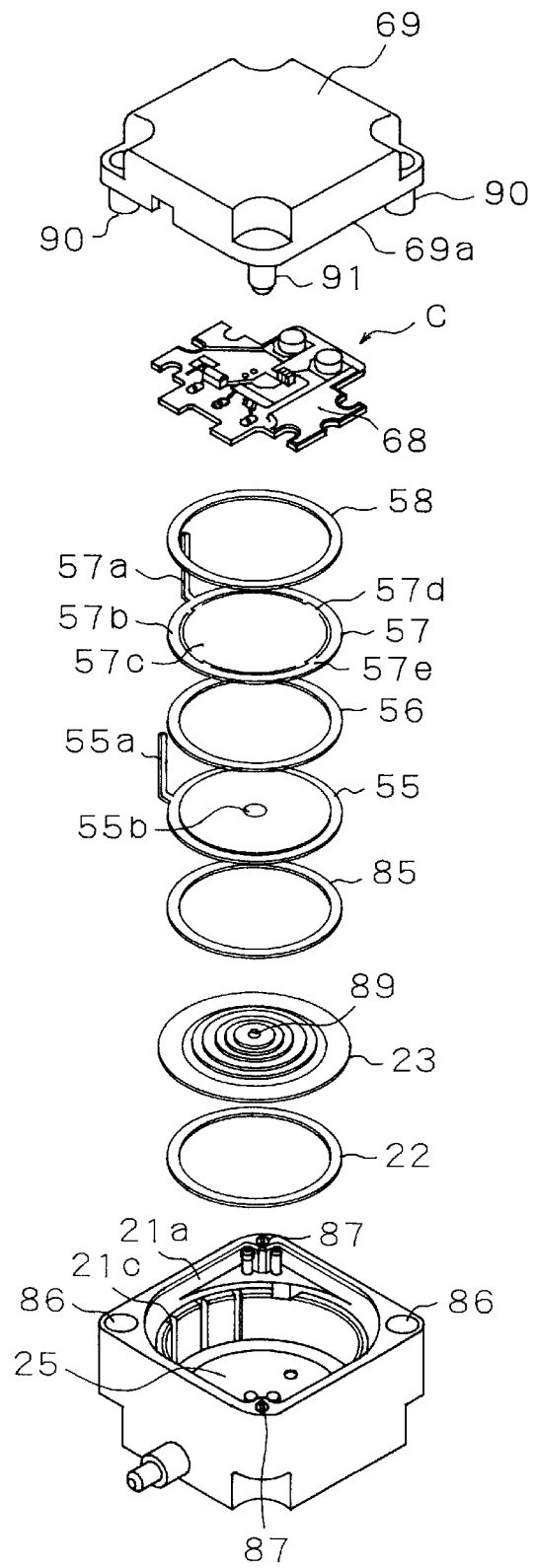
FIG. 25 is a perspective disassembled view of a pressure sensor as a fourth embodiment of this invention.

In FIG. 25, there is shown a pressure sensor according to a fourth embodiment of this invention. The pressure sensor includes an element (capacitor 1b) which is constructed into an element about the detection portion of the capacity C2 representing the second sensor section of the third embodiment, and a board 68 of the signal processing unit C mounted by the element (capacitor 1b), gate array 3, pulse generating circuit 4 and an element E (capacitor 2a of the reference unit 2) having a reference capacity CR, but omits the stationary electrode 59 of the third embodiment.

Thus, the pressure sensor of this fourth embodiment is composed of base 21, O ring 22, diaphragm 23, diaphragm fixing ring 85, stationary electrode 55, disc-shaped insulating film 56, movable electrode 57, disc-shaped insulating film 58, signal processing unit C, and cover 69. The base 21, the diaphragm 23, the diaphragm hold ring 85, the stationary electrode 55, the insulating films 56 an 58, the movable electrode 57, and the cover 69 have the same constructions as those of the above mentioned third embodiment.

The signal processing unit C includes a base 68 engageable with the receiver 21a of the base 21. The base 68 carries the gate array 3, the pulse output circuit 4, the element E (capacitor 2a of the reference unit 2) having the reference capacity CR, and the element (capacitor 1b) having the capacity C2.

The O ring 22 is engaged with the O ring engagement groove 27 of the base 21. Within the chamber 25 of the base 21 there are enclosed the diaphragm 23 and the diaphragm hold ring 85. The diaphragm 23 is seated within a diaphragm chamber 46 formed by the chamber 25 and the diaphragm chamber 46 at its pressure receiving portion is communicated with the inflow inlet 40.

The chamber 25 encloses diaphragm holding ring 85, stationary electrode 55, insulating film 56, movable electrode 57, and insulating film 58 in a piled-up fashion. The movable electrode 57 at its holding portion is sandwiched by the insulating films 58 and 56. The terminals 55a and 57a are inserted into the terminal insertion grooves 21c on an inner peripheral wall of the base 21.

The signal processing unit C is enclosed within the receiver 21a of the base 21, and the terminals 55a and 57a are connected with the corresponding connection pattern portion of the board 68. The cover 69 is put over the board 68, and secured onto the base 21 by inserting the guide pins 90 into the guide pin holes 86 and the insert pins 91 into the insert holes 87, while lead wire connected with the board 68 is extended outwardly of the cover 69.

In thus constructed pressure sensor, one end of the plunger portion 89 formed on the diaphragm 23 comes into contact with movable portion 57c of movable electrode 57 from the bottom through plunger passing hole 55b disposed in stationary electrode 55. The stationary electrode 55 and the movable electrode 57 provides the first sensor section (capacitor 1a) having the capacity C1 formed by the electrodes 55 and 57. The detection unit 1 is composed of the first sensor section and a second sensor section (capacitor 1b) which is formed in an element fashion.

As schematically shown in FIG. 6, in the gate array 3 which has the same electrostatic capacity detection circuit as that of the above-mentioned first embodiment shown in FIGS. 6 and 8, there are disposed CR oscillators 31, 32 and 33 respectively generating oscillation frequencies f1, f2 and fr which are defined by the electrostatic capacities C1, C2 and CR in connection with the detection and reference units 1 and 2 and resistances (not shown in drawings), and a frequency measuring circuit 3X which receives signals from the oscillators 31, 32 and 33 to generate in one period of the reference oscillation frequency fr from CR oscillator 33 a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Next, an operation of this pressure sensor of this fourth embodiment will be described hereinafter.

When the pressure at the receiving side of the diaphragm chamber 46 is zero, the movable electrode 57 in the detection unit 1 is not biased and the capacities C1 and C2 are equal. Thus, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into diaphragm chamber 46 through inflow inlet 40, the diaphragm 23 is displaced upwardly. The movable portion 57c of the movable electrode 57 is displaced upwardly by the plunger 89 displaced by the displaced diaphragm 23, and the capacities C1 and C2 have different capacitances. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The pressure sensor of this fourth embodiment includes the pressure receiving unit for detecting the pressure of pressure fluid, the reference unit 2 composed of the element (capacitor 2a) having a fixed capacity, the first sensor section including stationary electrode 55 and the movable electrode 57 movable in response to pressure detected by the pressure receiving unit and detecting the capacity C1 between the stationary electrode 55 and the movable electrode 57, the second sensor section composed of the element (capacitor 1b) having the capacity C2 for detecting the capacity C2, and the signal processing unit C for processing the capacity C1 detected by the first sensor section, the capacity C2 detected by the second sensor section, and the capacity CR detected by the detection unit 2 to generate a desired signal, whereby the detection error can be reduced, the number of components is reduced, and its productivity is greatly improved with reduced cost.

[Fifth Embodiment]

Figure 26:
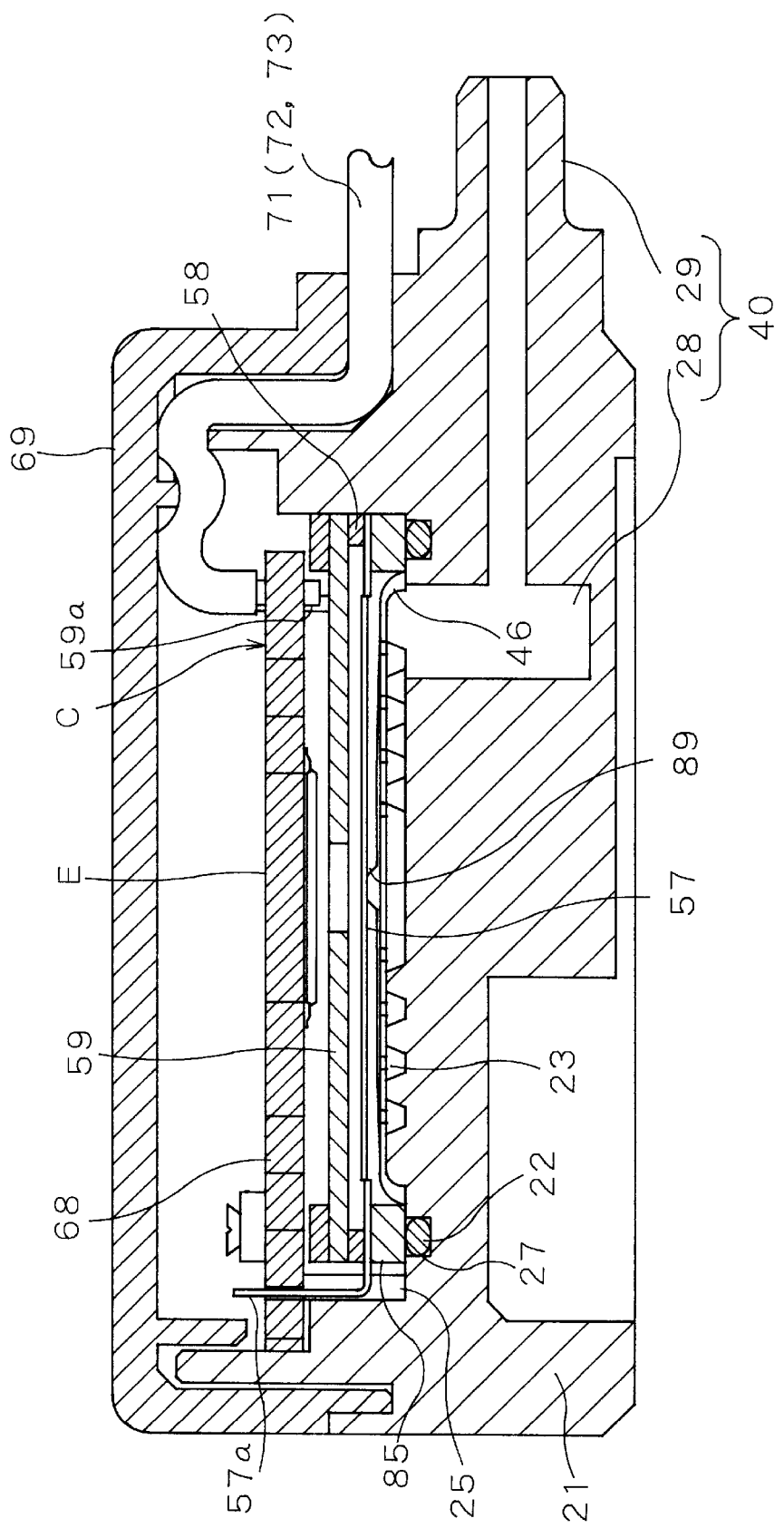
FIG. 26 is a longitudinal sectional view of a pressure sensor as a fifth embodiment of this invention.

In FIG. 26, there is shown a pressure sensor according to a fifth embodiment of this invention. The pressure sensor includes an element (capacitor 1a) which is constructed into an element about the detection portion of the capacity C1 representing the first sensor section of the fourth embodiment, and a board 68 of the signal processing unit C mounted by the element (capacitor 1a), gate array 3, pulse generating circuit 4 and an element E (capacitor 2a of the reference unit 2) having a reference capacity CR , but omits the stationary electrode 55 of the third embodiment.

Thus, the pressure sensor of this fifth embodiment is composed of base 21, O ring 22, diaphragm 23, diaphragm fixing ring 85, movable electrode 57, disc-shaped insulating film 58, stationary electrode 59, signal processing unit C, and cover 69. The base 21, the diaphragm 23, the insulating film 58, the movable electrode 57, and the cover 69 have the same constructions as those of the above mentioned fourth embodiment.

The signal processing unit C includes a base 68 engageable with the receiver 21a of the base 21. The base 68 carries the gate array 3, the pulse output circuit 4, the element E (capacitor 2a of the reference unit 2) having the reference capacity CR, and the element (capacitor 1a) having the capacity C1.

The O ring 22 is engaged with the O ring engagement groove 27 of the base 21. Within the chamber 25 of the base 21 there are enclosed the diaphragm 23 and the diaphragm hold ring 85. The diaphragm 23 is seated within a diaphragm chamber 46 formed by the chamber 25 and the diaphragm chamber 46 at its pressure receiving portion is communicated with the inflow inlet 40. The chamber 25 encloses diaphragm holding ring 85, movable electrode 57, insulating film 58, and stationary electrode 59 in a piled-up fashion. The movable electrode 57 at its holding portion 57b is sandwiched by the insulating films 58 and the diaphragm hold ring 85.

The signal processing unit C is enclosed within the receiver 21a of the base 21, and the terminals 57a and 59a are connected with the corresponding connection pattern portion of the board 68. In the same manner as that of the fourth embodiment, the cover 69 is put over the board 68, and secured onto the base 21 by inserting the guide pins 90 into the guide pin holes 86 and the insert pins 91 into the insert holes 87, while lead wire 71 (72 and 73) connected with the board 68 is extended outwardly of the cover 69.

In thus constructed pressure sensor, one end of the plunger portion 89 formed on the diaphragm 23 comes into contact with movable portion 57c of movable electrode 57 from the bottom. The stationary electrode 59 and the movable electrode 57 provides the second sensor section (capacitor 1b) having the capacity C2 formed by the electrodes 59 and 57. The detection unit 1 is composed of the second sensor section and a first sensor section (capacitor 1a) which is formed in an element fashion.

As schematically shown in FIG. 6, in the gate array 3 which has the same electrostatic capacity detection circuit as that of the above-mentioned first embodiment shown in FIGS. 6 and 8, there are disposed CR oscillators 31, 32 and 33 respectively generating oscillation frequencies f1, f2 and fr which are defined by the electrostatic capacities C1, C2 and CR in connection with the detection and reference units 1 and 2 and resistances (not shown in drawings), and a frequency measuring circuit 3X which receives signals from the oscillators 31, 32 and 33 to generate in one period of the reference oscillation frequency fr from CR oscillator 33 a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Next, an operation of this pressure sensor of this fifth embodiment will be described hereinafter.

When the pressure at the receiving side of the diaphragm chamber 46 is zero, the movable electrode 57 in the detection unit 1 is not biased and the capacities C1 and C2 are equal. Thus, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into diaphragm chamber 46 through inflow inlet 40, the diaphragm 23 is displaced upwardly. The movable portion 57c of the movable electrode 57 is displaced upwardly by the plunger 89 displaced by the displaced diaphragm 23, and the capacities C1 and C2 have different capacitances. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The pressure sensor of this fifth embodiment includes the pressure receiving section for detecting the pressure of pressure fluid, the reference unit 2 composed of the element (capacitor 2a) having a fixed capacity, the first sensor section composed of the element (capacitor 1a) for detecting the capacity C1, the second sensor section including stationary electrode 59 and the movable electrode 57 movable in response to pressure detected by the pressure receiving section and detecting the capacity C2 between the stationary electrode 59 and the movable electrode 57, and the signal processing unit C for processing the capacity C1 detected by the first sensor section, the capacity C2 detected by the second sensor section, and the reference capacity CR detected by the detection unit 2 to generate a desired signal, whereby the detection error can be extremely reduced, the number of components is reduced, and its productivity is greatly improved with reduced cost.

[Sixth Embodiment]

Figure 27:
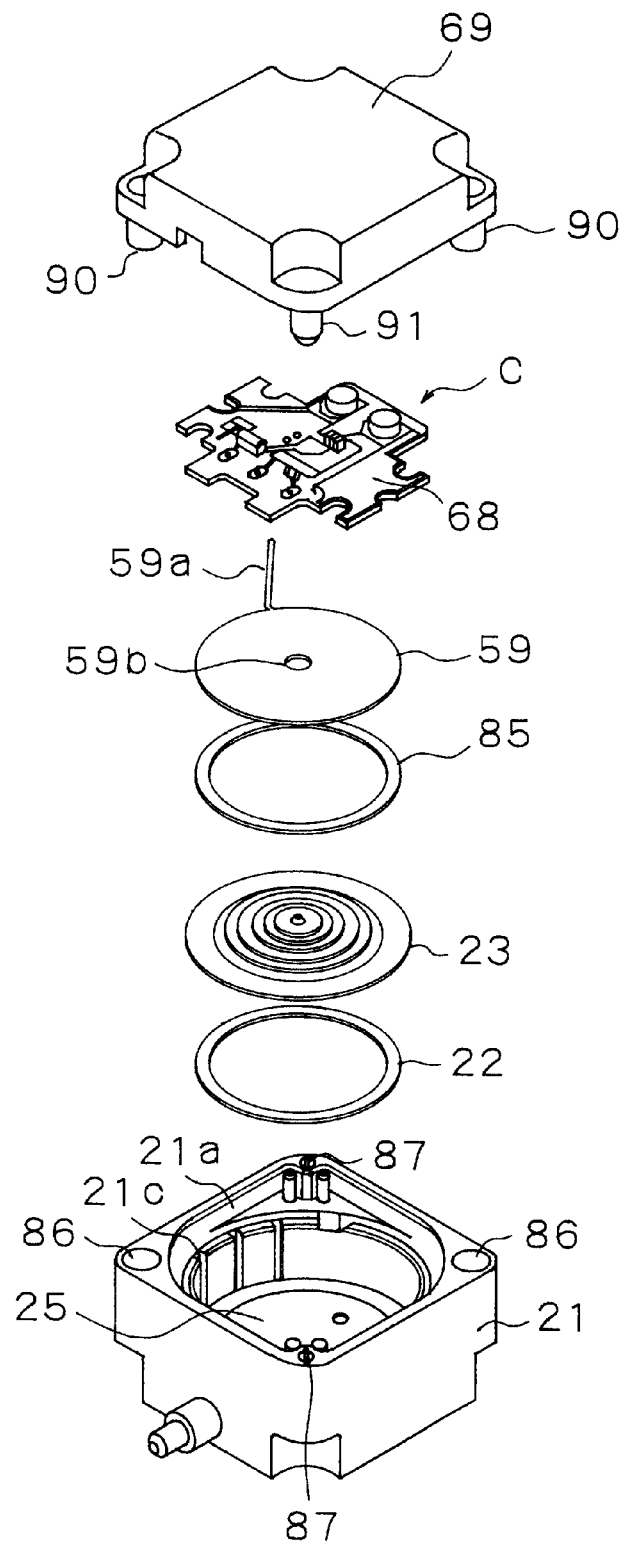
FIG. 27 is a perspective disassembled view of a pressure sensor as a sixth embodiment of this invention.

In FIG. 27, there is shown a pressure sensor according to a sixth embodiment of this invention. The pressure sensor includes an element (capacitor 1a) which is constructed into an element about the detection portion of the capacity C1 of the fourth embodiment, and a board 68 of the signal processing unit C mounted by the element (capacitor 1a), gate array 3, pulse generating circuit 4 and an element E (capacitor 2a of the reference unit 2) having a reference capacity CR, but omits the movable electrode 57 and the insulating rings 56 and 58 of the fourth embodiment by representing the diaphragm 23 with the movable electrode 57.

Thus, the pressure sensor of this sixth embodiment is composed of base 21, O ring 22, diaphragm 23 representing a movable electrode, diaphragm fixing ring 85, stationary electrode 59, signal processing unit C, and cover 69. The base 21, the diaphragm 23, the stationary electrode 59, and the cover 69 have the same constructions as those of the above mentioned fourth embodiment.

The signal processing unit C includes a base 68 engageable with the receiver 21a of the base 21. The base 68 carries the gate array 3, the pulse output circuit 4, the element E (capacitor 2a of the reference unit 2) having the reference capacity CR, and the element (capacitor 1a) having the capacity C1.

The O ring 22 is engaged with the O ring engagement groove 27 of the base 21. Within the chamber 25 of the base 21 there are enclosed the diaphragm 23 and the diaphragm hold ring 85. The diaphragm 23 is seated within a diaphragm chamber 46 formed by the chamber 25 and the diaphragm chamber 46 at its pressure receiving portion is communicated with the inflow inlet 40. The chamber 25 encloses diaphragm holding ring 85 and stationary electrode 59 in a piled-up fashion. A terminal portion 59a of the electrode 59 is inserted into terminal insertion groove 21c formed on an inner wall surface of the base 21.

The signal processing unit C is enclosed within the receiver 21a of the base 21, and the terminal portion 59a is connected with the corresponding connection pattern portion of the board 68. The cover 69 is put over the board 68, and secured onto the base 21 by inserting the guide pins 90 into the guide pin holes 86 and the insert pins 91 into the insert holes 87, while lead wire connected with the board 68 is extended outwardly of the cover 69.

In thus constructed pressure sensor, one end of the plunger portion 89 formed on the diaphragm 23 pierces a plunge piercing opening 59b of the stationary contact 59. The stationary electrode 59 and the diaphragm 23 serving as the movable electrode provides the second sensor section (capacitor 1b) having the capacity C2 formed between the electrode 59 and the diaphragm 23. The detection unit 1 is composed of the second sensor section and a first sensor section (capacitor 1a) which is formed in an element fashion.

As schematically shown in FIG. 6, in the gate array 3 which has the same electrostatic capacity detection circuit as that of the above-mentioned first embodiment shown in FIGS. 6 and 8, there are disposed CR oscillators 31, 32 and 33 respectively generating oscillation frequencies f1, f2 and fr which are defined by the electrostatic capacities C1, C2 and CR in connection with the detection and reference units 1 and 2 and resistances (not shown in drawings), and a frequency measuring circuit 3X which receives signals from the oscillators 31, 32 and 33 to generate in one period of the reference oscillation frequency fr from CR oscillator 33 a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Next, an operation of this pressure sensor of this sixth embodiment will be described hereinafter.

When the pressure at the receiving side of the diaphragm chamber 46 is zero, the diaphragm 23 serving as movable electrode is not biased and the capacities C1 and C2 are equal. Therefore, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into diaphragm chamber 46 through inflow inlet 40, the diaphragm 23 is displaced upwardly. Upon the upward displacement of the diaphragm 23, the capacities C1 and C2 have different capacitances. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The pressure sensor of this sixth embodiment includes the pressure receiving section for detecting the pressure of pressure fluid and serving as a movable electrode, the reference unit 2 composed of the element (capacitor 2a) having a fixed capacity, the first sensor section composed of the element (capacitor 1a) for detecting the capacity C1, the second sensor section including stationary electrode 59 and detecting the capacity C2 between the stationary electrode 59 and the pressure receiving section being displaced by the detected pressure, and the signal processing unit C for processing the capacity C1 detected by the first sensor section, the capacity C2 detected by the second sensor section, and the reference capacity CR detected by the detection unit 2 to generate a desired signal, whereby the detection error can be extremely reduced, the number of components is reduced, and its productivity is greatly improved with reduced cost.

[Seventh Embodiment]

Figure 28:
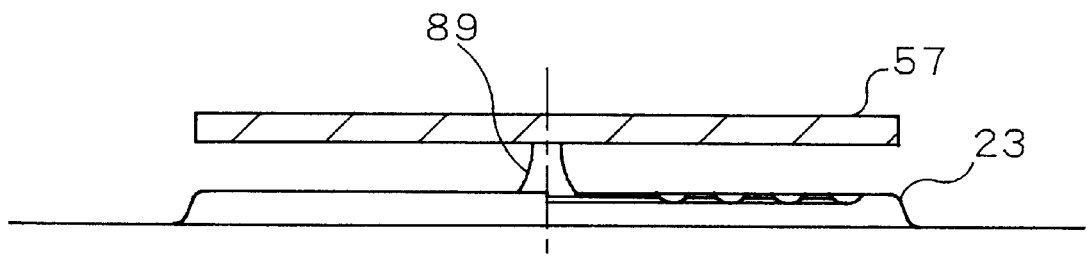
FIG. 28 is a sectional view of a movable electrode and a diaphragm which are employed in a pressure sensor as a seventh embodiment of this invention.
Figure 29:
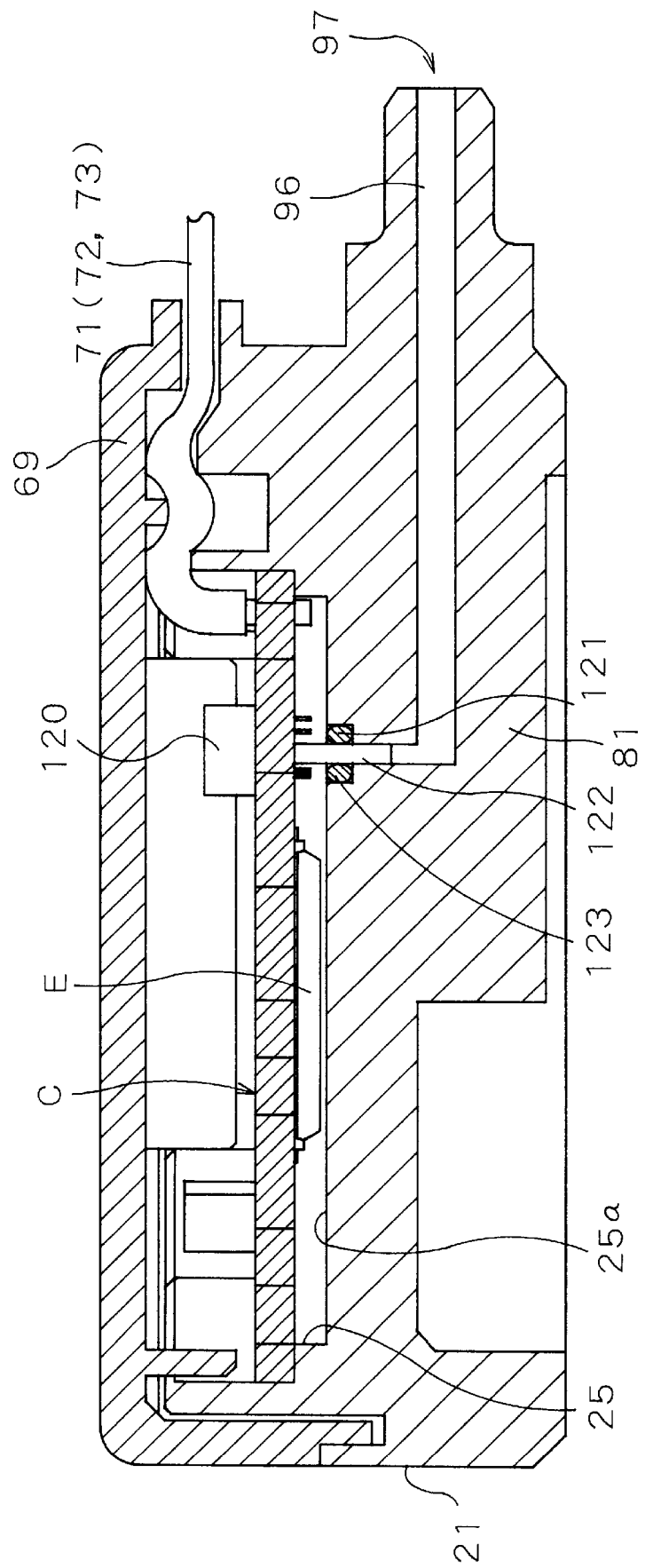
FIG. 29 is a longitudinal sectional view of a pressure sensor as a eighth embodiment of this invention.

In FIG. 28, there is shown a pressure sensor according to a seventh embodiment of this invention. The pressure sensor is a modification of the sixth embodiment, and employs the movable electrode 57 omitted in the sixth embodiment which is fixed on an upper surface (plunger portion 89).

Other components have the same constructions as those of the above mentioned sixth embodiment.

When the pressure at the receiving side of the diaphragm chamber 46 is zero, the diaphragm 23 is not biased, the movable electrode 57 is not displaced and the capacities C1 and C2 are equal. Therefore, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into diaphragm chamber 46 through inflow inlet 40, the diaphragm 23 is biassed biased upwardly, the movable electrode 57 is simultaneously displaced upwardly, and the capacities C1 and C2 have different capacitances. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The pressure sensor of this seventh embodiment includes the pressure receiving section for detecting the pressure of pressure fluid, the reference unit 2 composed of the element (capacitor 2a) having a fixed capacity, the first sensor section composed of the element (capacitor 1a) for detecting the capacity C1, the second sensor section including stationary electrode 59 and detecting the capacity C2 between the stationary electrode 59 and the movable electrode 57 disposed on the pressure receiving section being displaced by the detected pressure, and the signal processing unit C for processing the capacity C1 detected by the first sensor section, the capacity C2 detected by the second sensor section, and the reference capacity CR detected by the detection unit 2 to generate a desired signal, whereby the detection error can be extremely reduced, the number of components is reduced, and its productivity is greatly improved with reduced cost.

[Eighth Embodiment]

In FIGS. 29 through 32, there is shown a pressure sensor according to a eighth embodiment of this invention.

The pressure sensor includes a microsensor 120 in which the capacitor 1b having the capacitor C2 and the diaphragm 23 of the sixth embodiment are assembled in a single unit, and a board 68 of the signal processing unit C mounted by the microsensor 120, gate array 3, pulse generating circuit 4 and an element E (capacitor 2a of the reference unit 2) having a reference capacity CR.

Thus, the pressure sensor of this eighth embodiment is composed of base 21, O ring 121, microsensor 120, signal processing unit C, and cover 69.

The base 21 is provided with a cylindrical chamber 25 having a circular section in a horizontal view and a circular bottom wall 25a which includes an engagement hole 122 communicated with a connection tube 96 and an O ring engagement groove 123 coaxial with the hole 122. The hole 122 communicates with the connection tube 96, which provides an inflow inlet 97. The base 21 includes a signal processing unit receiver 21a on an upper wall of the base 21, guide pin holes 86 at one opposite positions on an upper contact surface 21b, and pin insertion holes 87 at the other opposite positions.

Figure 31:
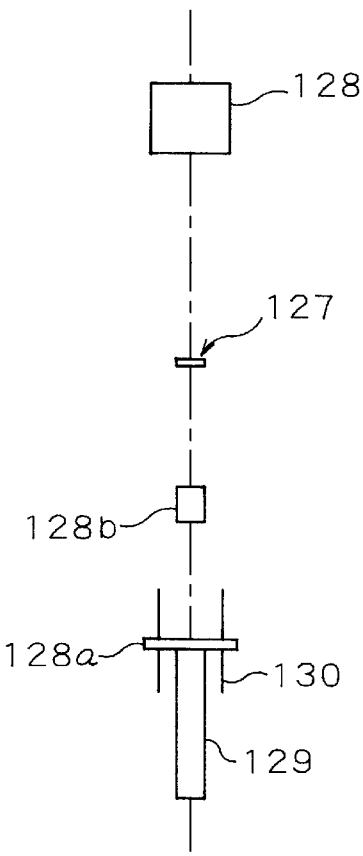
FIG. 31 a disassembled view of a microsensor employed in the pressure sensor.
Figure 32:
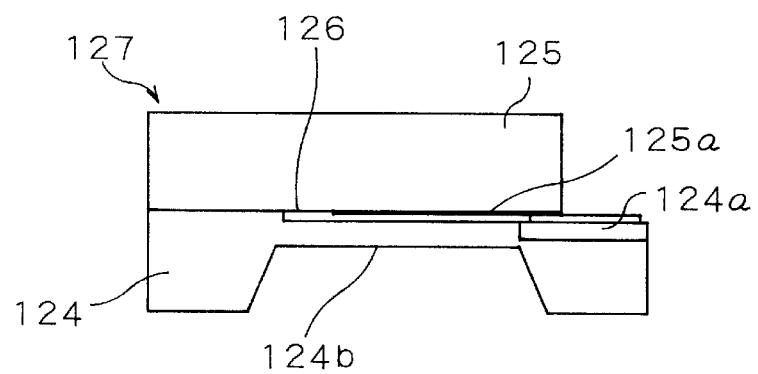
FIG. 32 shows a sensor element of the microsensor.

As shown in FIG. 32, the microsensor 120 includes a sensor element 127 in which a glass element 125 is put on a silicone element 124 retaining a gap 126 between the elements 124 and 125. As shown in FIG. 31, the sensor element 127 is mounted on a stem 128a through a pedestal 128b to be enclosed within a housing 128. A voltage is adapted to be applied across the elements 124 and 125. A guide tube 129 is disposed on a lower surface of the stem 128a to communicate with a pressure receiving portion 124b of the silicone element 124. Terminals 130 extending from electrodes 124a and 125a connected with the silicone element 124 and the glass element 125 externally extend from a lower surface of the stem 128a. There is disposed a vent opening 131 on an upper wall of the housing 128.

The signal processing unit C includes a base 68 engageable with the receiver 21a of the base 21. The base 68 carries the gate array 3, the pulse output circuit 4, the element E (capacitor 2a of the reference unit 2) having the reference capacity CR, and the element (capacitor 1a) having the capacity C1. The board 68 is provided with an opening 135 and a plurality of through holes 136 around the opening 135.

The microsensor 120 is mounted on the board 68 by inserting the guide tube 129 into the opening 135 and the terminals 130 into the through holes 136 to be soldered, the O ring 121 is mounted on the O ring engagement groove 123, the guide tube 129 of the microsensor 120 is engaged with the hole 122 of the chamber 25, the microsensor 120 and the board of the signal processing unit C are enclosed within the chamber 25, and the cover 69 is put over the board 68 to be fixed to the base 21 by inserting the guide pins 90 into the guide pin holes 86 and the insertion pins 91 into the pin insertion holes 87. The lead wire 71 (72 and 73) extends outwardly of the cover 69.

In thus constructed pressure sensor, the silicone element 124 and the glass element 125 of the microsensor 120 detects variation of voltage across the electrodes 124a and 125a to be converted into the capacitance C1. The microsensor 120 and the above-mentioned element (capacitor 1a) provide the pressure receiving section and the detection unit 1.

As schematically shown in FIG. 6, in the gate array 3 which has the same electrostatic capacity detection circuit as that of the above-mentioned first embodiment shown in FIGS. 6 and 8, there are disposed CR oscillators 31, 32 and 33 respectively generating oscillation frequencies f1, f2 and fr which are defined by the electrostatic capacities C1, C2 and CR in connection with the detection and reference units 1 and 2 and resistances (not shown in drawings), and a frequency measuring circuit 3X which receives signals from the oscillators 31, 32 and 33 to generate in one period of the reference oscillation frequency fr from CR oscillator 33 a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Next, an operation of this pressure sensor of this eighth embodiment will be described hereinafter.

When the pressure at the receiving side 124b of the silicone element 124 in the microsensor 120 is zero, the silicone element 124 is not biased and the capacities C1 and C2 are equal. Thus, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into the pressure receiving portion 124b of the silicone element 124 through the guide tube 129 of the microsensor 120 from the inflow inlet 97, the silicone element 124 is biassed and the voltage across the silicone element 124 and the glass element 125 varies. The voltage is converted into capacitance C1, and, as a result, the capacities C1 and C2 have different values. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The pressure sensor of this eighth embodiment includes the reference unit 2 composed of the element (capacitor 2a) having a fixed capacity, the first sensor section composed of the element (capacitor 1a) for detecting the capacity C1, the microsensor 120 for detecting the pressure of pressure fluid to convert the change of the pressure into the change of the capacity C2, and the signal processing unit C which processes the capacity C1 detected by the first sensor section, the capacity C2 detected by the microsensor 120 and the reference capacity CR detected by the detection unit 2 to generate a desired signal and is mounted by the microprocessor 120, whereby the detection error can be extremely reduced, the number of components is reduced, and its productivity is greatly improved with reduced cost.

[Ninth Embodiment]

In FIG. 33, there is shown a pressure sensor according to a ninth embodiment of this invention.

The pressure sensor of this embodiment is modified from the sensor of the eighth embodiment by mounting the microsensor 120 on the board 68 of the signal processing unit C through a flexible board 122 though the microsensor 120 is directly mounted on the board 68 in the eighth embodiment. On the board 68 there are mounted the flexible board 122 carrying the microsensor 120, the gate array 3, the pulse generating circuit 4 and an element E (capacitor 2a of the reference unit 2) having a reference capacity CR, and the element (capacitor 1a).

Thus, the pressure sensor of this ninth embodiment is composed of base 21, O ring 121, flexible board 122, microsensor 120, signal processing unit C, and cover 69.

The base 21 is provided with a cylindrical chamber 25 having a circular section in a horizontal view and a circular bottom wall 25a which includes an engagement hole 122 communicated with a connection tube 96 and an O ring engagement groove 123 coaxial with the hole 122. The hole 122 communicates with the connection tube 96 to provide an inflow inlet 97. The base 21 includes a signal processing unit receiver 21a on an upper wall of the base 21, guide pin holes 86 at one opposite positions on an upper contact surface 21b, and pin insertion holes 87 at the other opposite positions.

The microsensor 120 of this embodiment is the same as that of the eighth embodiment. The flexible board 122 at one end thereof is provided with an opening 132 and a plurality of through holes 133 around the opening 132, and at other end thereof a connecting portion 134 having a pattern connected with the through holes 133.

The signal processing unit C includes a base 68 engageable with the receiver 21a of the base 21. The base 68 carries the gate array 3, the pulse output circuit 4, the capacity detection element E (capacitor 2a of the reference unit 2) having the reference capacity CR, and the element (capacitor 1a) having the capacity C1.

The microsensor 120 is mounted on one end of the flexible board 122 by inserting the guide tube 129 into the opening 132 and the terminals 130 into the through holes 133 to be soldered, the O ring 121 is mounted on the O ring engagement groove 123, the guide tube 129 of the microsensor 120 is engaged with the hole 122 of the chamber 25, the connection portion 134 of the flexible board 122 are connected with the connection portion of the board 68 of the signal processing unit C, the microsensor 120, the flexible board 122 and the board 68 of the signal processing unit C are enclosed within the chamber 25, and the cover 69 is put over the board 68 to be fixed to the base 21 by inserting the guide pins 90 into the guide pin holes 86 and the insertion pins 91 into the pin insertion holes 87. The lead wire connected with the board 68 extends outwardly of the cover 69.

In thus constructed pressure sensor, the silicone element 124 and the glass element 125 of the microsensor 120 detects variation of voltage across the electrodes 124a and 125a to be converted into the capacitance C1. The microsensor 120 and the above-mentioned element (capacitor 1a) provide the pressure receiving section and the detection unit 1.

As schematically shown in FIG. 6, in the gate array 3 which has the same electrostatic capacity detection circuit as that of the above-mentioned first embodiment, there are disposed CR oscillators 31, 32 and 33 respectively generating oscillation frequencies f1, f2 and fr which are defined by the electrostatic capacities C1, C2 and CR in connection with the detection and reference units 1 and 2 and resistances (not shown in drawings), and a frequency measuring circuit 3X which receives signals from the oscillators 31, 32 and 33 to generate in one period of the reference oscillation frequency fr from CR oscillator 33 a pulse signal in response to a frequency difference between oscillation frequency f1 at the first half period and oscillation frequency f2 at the second half period. The pulse output circuit 4 is designed to apply signal processing, such as amplification, level adjustment and so forth, to a pulse signal generated from gate array 3.

Next, an operation of this pressure sensor of this ninth embodiment will be described hereinafter.

When the pressure at the side of the pressure receiving portion 124b of the silicone element 124 in the microsensor 120 is zero, the silicone element 124 is not biased and the capacities C1 and C2 are equal. Thus, the oscillation frequencies f1 and f2 are equal, and the frequency difference between the frequency f1 at the first half period and the frequency f2 at the second half period is zero, and no pulse signal is generated from the gate array 3.

As pressure fluid (for example, gas) is introduced into the pressure receiving portion 124b of the silicone element 124 through the guide tube 129 of the microsensor 120 from the inflow inlet 97, the silicone element 124 is biassed and the voltage across the silicone element 124 and the glass element 125 varies. The voltage is converted into capacitance C1, and, as a result, the capacities C1 and C2 have different values. Accordingly, there is produced a frequency difference between the frequency f1 at the first half period and the frequency f2 at the second half period regarding the reference frequency fr from the oscillator 33, so that the frequency difference, viz., the signal having the number of pulses in proportion to the pressure to be detected, is generated from the gate array 3.

The pressure sensor of this ninth embodiment includes the reference unit 2 composed of the element (capacitor 2a) having a fixed capacity, the sensor section composed of the element (capacitor 1a) for detecting the capacity C1, the microsensor 120 for detecting the pressure of pressure fluid to convert the change of the pressure into the change of the capacity C2, and the signal processing unit C which processes the capacity C1 detected by the sensor section, the capacity C2 detected by the microsensor 120 and the reference capacity CR detected by the detection unit 2 to generate a desired signal. The microprocessor 120 is mounted on the flexible board 122, and connected with the board 68 of the signal processing unit C. Accordingly, the sensor of this embodiment has the advantages that the detection error is extremely reduced, the number of components is reduced, and its productivity is greatly improved with reduced cost.

Figure 34:
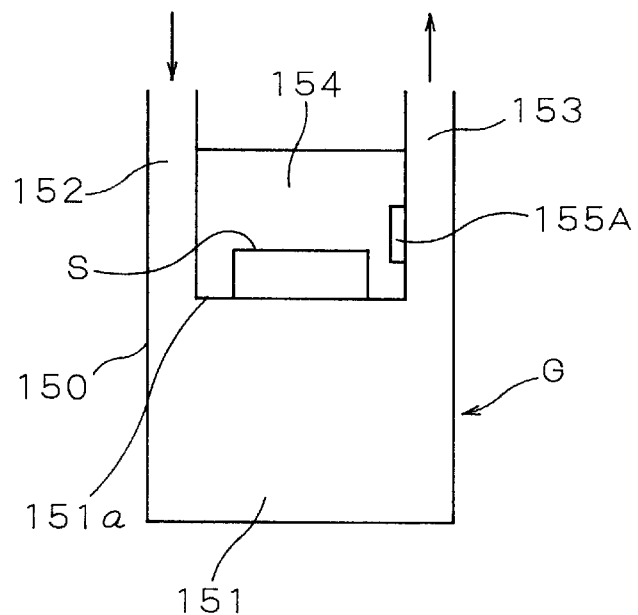
FIG. 34 is a schematic view of a gas meter employing the pressure sensor according to this invention.

In FIG. 34, there is shown a schematic view of a gas meter G employing the pressure sensor embodied in one of the above first through ninth embodiments.

A main body of the gas meter G includes a measuring chamber 151, a gas introducing path 152 introducing a gas into the measuring chamber, an exhausting path 153 for externally exhausting gas from the measuring chamber 151, and a pressure sensor enclosure 154, in which the measuring chamber is provided with a meter device (not shown) and the gas exhausting path is provided with a closing valve 155A. On a ceiling 151a of the measuring chamber 151 there are disposed a gas pressure introducing path 155 and a sealing seat 157 surrounding the path 155.

Figure 35:
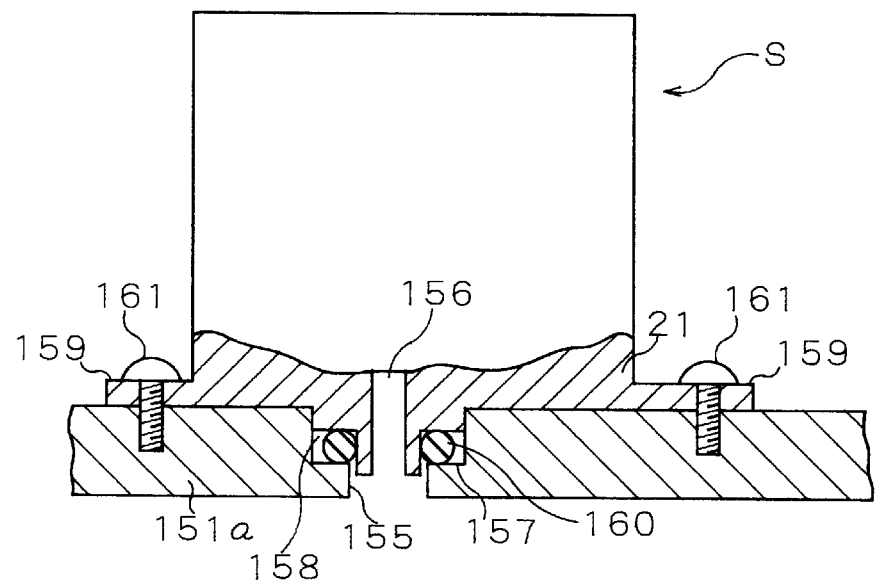
FIG. 35 is a partial sectional view of a mounting portion of the pressure sensor in the gas meter.

A pressure sensor S mentioned in the above embodiments is installed and secured into the pressure sensor enclosure 154 of the meter body of the gas meter G. The pressure sensor S is designed to include a modified base 21. As shown in FIG. 35, the base 21 includes a sealing mounting portion 158 on a lower surface of the base, mounting portions 159 at both sides of the base, and a gas path 156 communicating with the diaphragm chamber (46) or the pressure receiving portion (124b) of the silicone element 124 of the microsensor (120).

An O ring 160 is mounted on the sealing mounting portion 158 of the base 21, the mounting seats 159 of both sides of the base 21 are secured onto a bottom wall of the pressure sensor enclosure 154 by mounting screws 161 to press the O ring 160 onto the sealing seat 157 to contact therewith, and the gas pressure introducing path 155 is communicated with the gas path 156. The sealing mounting portion 158, the O ring 160 and the sealing seat 157 provide a sealing means. A driver (not shown) of the closing valve 155A is connected with an output terminal of a judging circuit mounted on the base (68) of the signal processing unit C.

Next, an operation of the gas meter G will be explained hereinafter.

In the gas meter G, gas is introduced into the measuring chamber 151 through the gas introducing path 152, measured by the meter device, and exhausted from the gas exhausting path 153. The gas pressure within the measuring chamber 151 is always applied to the diaphragm (83) or the pressure receiving portion (124b) of the silicone element (124) of the microsensor (120) through a gas path 156 of the pressure sensor S.

As the gas pressure decreases, the pressure sensor S generates a signal representing a decrease of the pressure to be applied to the judging circuit and the judging circuit drives the closing valve 155A to stop the gas supply.

The pressure sensor S may be provided with a seismoscope (not shown) which generates a signal in accordance with the degree of an earthquake. As the degree of the earthquake reaches a predetermined level, the judging circuit actuates the driver for the valve 155A to close the gas supply by the valve.

As described above, the gas meter G includes the gas pressure introducing path 155 formed on a wall of the measuring chamber 154 within the meter body 150, and the pressure sensor S secured on a wall of the measuring chamber 154 through a sealing means the pressure receiving portion of which communicates with the gas pressure introducing path 155, whereby any specific gas introducing tube to introduce the gas into the pressure sensor S is not required and the problems of sealing at an insertion portion of the specific gas introducing tube toward the measuring chamber 156 are resolved.

Moreover, the gas meter G having the pressure sensor S provided with a seismoscope for detecting an earthquake according to this invention can control a quantity of gas flow when a predetermined seismic intensity happens because of the control means added to the signal processing unit C of the pressure sensor S for receiving a detection signal from the seismoscope to control the quantity of gas flow as the earthquake reaches the predetermined seismic intensity.

It should be understood that the above description is merely illustrative of this invention and that many changes and modifications may be made by those skilled in the art without departing from the scope the appended claims.

What is claimed is:

1. A pressure sensor comprising:

a pressure receiving portion for detecting a pressure of a fluid, said pressure receiving portion including a diaphragm in contact with a plunger;

a reference unit including a reference capacitor unvaried by said pressure;

a detection unit including a pair of stationary electrodes and a movable electrode positioned between the stationary electrodes, said movable electrode being displaced by the plunger when the pressure detected by said pressure receiving portion displaces the diaphragm, said detection unit detecting a first capacity between the movable electrode and one of the stationary electrodes and a second capacity between the movable electrode and the other one of the stationary electrodes; and a signal processing unit coupled to said reference unit and said detection unit for processing said first and second capacities detected by said detection unit and a reference capacity of said reference unit to generate an output signal indicative of said pressure.

2. A pressure sensor according to claim 1, in which said reference unit is composed of an element having a fixed capacity.

3. A pressure sensor according to claim 1, in which said reference unit is composed of an element having a fixed capacity and covered with an electric field shielding.

4. A pressure sensor comprising:

a pressure receiving portion for detecting a pressure of a fluid, said pressure receiving portion including a diaphragm in contact with a plunger;

a reference unit composed of an element having a fixed capacity;

a first sensor section including a stationary electrode and a movable electrode, said movable electrode being displaced by the plunger when the pressure detected by said pressure receiving portion displaces the diaphragm, said first sensor section detecting a capacity between the stationary electrode and the movable electrode;

a second sensor section composed of an element, said second sensor section detecting a capacity of the element; and a signal processing unit coupled to said first sensor section, said second sensor section, and said reference unit, said signal processing unit processing the capacity detected by said first sensor section, the capacity detected by said second sensor section, and the fixed capacity of said reference unit to generate an output indicative of said pressure.

5. A pressure sensor comprising:

a pressure receiving portion for detecting a pressure of a fluid, said pressure receiving portion including a movable electrode, said pressure receiving portion further including a diaphragm in contact with a plunger, wherein said plunger displaces said movable electrode as said diaphragm is displaced;

a reference unit composed of an element having a fixed capacity;

a first sensor section composed of an element, said first sensor section detecting a capacity of the element;

a second sensor section including a stationary electrode, said second sensor section detecting a capacity between said stationary electrode and said pressure receiving portion, said pressure receiving portion being displaced in response to the pressure detected by the pressure receiving portion; and a signal processing unit coupled to said first sensor section, said second sensor section, and said reference unit, said signal processing unit processing the capacity detected by said first sensor section, the capacity detected by said second sensor section, and the fixed capacity of said reference unit to generate an output indicative of said pressure.

6. A pressure sensor comprising;

a pressure receiving portion for detecting a pressure of a fluid, said pressure receiving portion including a diaphragm in contact with a plunger;

a reference unit composed of an element having a fixed capacity;

a first sensor section composed of an element, said first sensor section detecting a capacity of the element;

a second sensor section including a stationary electrode, said second sensor section detecting a capacity between said stationary electrode and a movable electrode, said movable electrode being disposed on said pressure receiving portion wherein said movable electrode is displaced by the plunger in response to said pressure displacing the diaphragm; and a signal processing unit coupled to said first sensor section, said second sensor section, and said reference unit, said signal processing unit processing the capacity detected by said first sensor section, the capacity detected by said second sensor section, and the fixed capacity of said reference unit to generate an output indicative of said pressure.

7. A pressure sensor comprising:

a reference unit composed of an element having a fixed capacity;

a sensor section composed of an element, said sensor section detecting a capacity of the element, a microsensor for detecting a pressure of a fluid and for converting a variation of the detected pressure into a capacity change of a capacity of the microsensor, and a signal processing unit coupled to said sensor section, said microsensor, and said reference unit, said signal processing unit processing the capacity detected by said sensor section, the capacity detected by said microsensor, and the fixed capacity of said reference unit to generate an output indicative of said pressure, said signal processing unit including a first oscillator for generating a detection frequency signal according to the capacity detected by said microsensor, a second oscillator for generating a reference frequency signal according to the fixed capacity of said reference unit, and a measuring section for measuring the number of periods of said detection frequency signal in a predetermined period of said reference frequency signal to generate a measured signal, wherein said first and second oscillators include oscillation circuits for generating oscillation signals of frequencies defined by respective capacities and resistances, and circuits for equalizing electric charges remaining in capacitors of said capacities in accordance with a predetermined signal.

8. A pressure sensor according to claim 7, in which said microsensor is mounted on a board of said signal processing unit.

9. A pressure sensor according to claim 7, in which said microsensor is mounted on a flexible board and connected with said signal processing unit through said flexible board.

10. A pressure sensor comprising:

a pressure receiving unit for detecting a pressure of a fluid, said pressure receiving unit including a base having a diaphragm removably enclosed therein, said diaphragm having a flat face perpendicular to a direction of its displacement, said base further comprising a stopper positioned opposed to said flat face of said diaphragm;

a sensor unit including a detection unit which has a plurality of stationary electrodes and a movable electrode, said movable electrode being held in an insulated fashion between said stationary electrodes and wherein said movable electrode is displaced by the pressure detected by said pressure receiving unit, and a reference unit which has a plurality of stationary electrodes spaced therebetween; and a signal processing unit coupled to said sensor unit for processing a plurality of capacities detected by said detection unit and said references unit to generate an output indicative of said pressure.

11. A pressure sensor according to claim 10, wherein said base encloses said sensor unit and said sensor unit includes an electrode holder for enclosing said signal processing unit.

12. A pressure sensor according to claim 10, in which a member for insulating and holding said movable electrode and for spacing the stationary electrodes of said reference unit is made of an insulating film.

13. A pressure sensor according to claim 10, in which said detection unit of said sensor unit is of an area variable type.

14. A pressure sensor according to claim 10, in which said pressure receiving unit at its receiving portion is provided with a metal bellows.

15. A pressure sensor including an electrostatic capacity detection circuit, said detection circuit comprising:

a detection unit having a capacity varied by a predetermined external action, a reference unit having a capacity unvaried by said predetermined external action, a first oscillator for generating a detection frequency signal according to the capacity of said detection unit, a second oscillator for generating a reference frequency signal according to the capacity of said reference unit, and a measuring section for measuring the number of periods of said detection frequency signal in a predetermined period of said reference frequency signal to generate a measured signal, wherein said first and second oscillators are provided with a pair of oscillation sections including clocked gate circuits which are switched into inverters or high impedance output states by a clock signal and generate oscillation signals having the respective frequencies defined by capacities and resistances, and with a gate circuit in response to a given control signal for generating said clock signal, said oscillators stopping or starting their oscillation in accordance with respectively given clock signals.

16. A pressure sensor including an electrostatic capacity detection circuit, said detection circuit comprising:

a detection unit having a capacity varied by a predetermined external action, a reference unit having a capacity unvaried by said predetermined external action, a first oscillator for generating a detection frequency signal according to the capacity of said detection unit, a second oscillator for generating a reference frequency signal according to the capacity of said reference unit, and a measuring section for measuring the number of periods of said detection frequency signal in a predetermined period of said reference frequency signal to generate a measured signal, wherein said first and second oscillators include oscillation circuits for generating oscillation signals of frequencies defined by respective capacities and resistances, and circuits for equalizing electric charges remaining in capacitors of said capacities in accordance with a predetermined signal.

17. A gas meter having a main body, said gas meter comprising:

a pressure sensor including a detection unit having capacities varied by a predetermined external action, a reference unit having a capacity unvaried by said predetermined external action, and signal processing means for processing said capacities detected by said detection unit and said capacity of said reference unit to generate an output signal, and a gas inflow inlet disposed on a wall of a measuring chamber of said main body of said gas meter, in which said pressure sensor is secured on a wall of said measuring chamber through a sealing member, and a pressure receiving portion of said pressure sensor is communicated with a gas pressure inflow path, and wherein said signal processing unit includes a first oscillator for generating a detection frequency signal according to the capacity detected by said detection unit, a second oscillator for generating a reference frequency signal according to the capacity of said reference unit, and a measuring section for measuring the number of periods of said detection frequency signal in a predetermined period of said reference frequency signal to generate a measured signal, wherein said first and second oscillators include oscillation circuits for generating oscillation signals of frequencies defined by respective capacities and resistances, and circuits for equalizing electric charges remaining in capacitors of said capacities in accordance with a predetermined signal.

* * * * *